(12) United States Patent
Winkel

(10) Patent No.: US 9,033,239 B2
(45) Date of Patent: May 19, 2015

(54) PROJECTED IMAGE PLANOGRAM SYSTEM

(71) Applicant: James T. Winkel, Wayzata, MN (US)

(72) Inventor: James T. Winkel, Wayzata, MN (US)

(73) Assignee: James T. Winkel, Wayzata, MN (US)

( * ) Notice: Subject to any disclaimer, the term of this patent is extended or adjusted under 35 U.S.C. 154(b) by 0 days.

(21) Appl. No.: 13/674,627

(22) Filed: Nov. 12, 2012

(65) Prior Publication Data

US 2013/0119138 A1 May 16, 2013

Related U.S. Application Data

(60) Provisional application No. 61/558,834, filed on Nov. 11, 2011, provisional application No. 61/680,576, filed on Aug. 7, 2012.

(51) Int. Cl.
*G06K 7/10* (2006.01)
*G06Q 10/08* (2012.01)

(52) U.S. Cl.
CPC .................................... *G06Q 10/087* (2013.01)

(58) Field of Classification Search
CPC ............................... G06K 7/14; G06K 7/1404
USPC ...................... 235/462.1, 383, 385
See application file for complete search history.

(56) References Cited

U.S. PATENT DOCUMENTS

| | | | |
|---|---|---|---|
| 6,473,984 B1 | 11/2002 | Splain et al. | |
| 7,546,950 B2 | 6/2009 | Thiyagarajah | |
| 7,957,998 B2 | 6/2011 | Riley et al. | |
| 7,997,734 B2 | 8/2011 | Mochizuki et al. | |
| 8,049,621 B1 * | 11/2011 | Egan ........................... | 340/572.1 |
| 8,229,781 B2 * | 7/2012 | Zenor et al. ................... | 705/7.31 |
| 2005/0038768 A1 | 2/2005 | Morris | |
| 2006/0259371 A1 * | 11/2006 | Perrier et al. ................... | 705/26 |
| 2007/0288296 A1 | 12/2007 | Lewis | |
| 2009/0059270 A1 | 3/2009 | Opalach et al. | |

FOREIGN PATENT DOCUMENTS

WO    WO 02/082178 A2    10/2002

OTHER PUBLICATIONS

Gladson Category Management Services at http://www.gladson.com/our-services/category-management-services, 1 page, © 2012, as accessed on Feb. 11, 2013.
Shelf Logic Software at http://www.shelflogic.com/default.htm, 1 page, as accessed on Feb. 11, 2013.

(Continued)

*Primary Examiner* — Daniel St Cyr
(74) *Attorney, Agent, or Firm* — Christensen Fonder P.A.

(57) ABSTRACT

An automated projected image display planning and implementation system used in planogramming. Embodiments include a camera, projector, bar code reader, and software to store planograms as designed, communicate these planograms to retail locations, and provide an easy-to-use system insuring that the planograms are recreated as originally conceived. Embodiments create a unique QR code for storing and communicating fixture and merchandise data information as well as the relative placement location within the planogram. Embodiments are configured to project the image of the finished planogram on the display, and further, to illuminating the exact location within the planogram of merchandise and fixtures displayed on the planogram.

15 Claims, 18 Drawing Sheets

(56) References Cited

OTHER PUBLICATIONS

Easy Planogram and Store Layout Software at http://www.smartdraw.com/specials/planogram.htm, 2 pages, as accessed on Feb. 11, 2013.

Planogram Software Solution at http://www.ezpog.com/index.htm, 1 page, as accessed on Feb. 11, 2013.

Mediatronic Systems, Planographics Software at http://palms.dyndns.org/planographics/, as accessed on Feb. 11, 2013.

Jda: The Supply Chain Company, JDA Planogram Generator at http://www.jda.com/solutions/planogram-generator, 1 page, as accessed on Feb. 11, 2013.

Nielsen, The Nielsen Company at http://www.nielsen.com/au/en.html, 1 page, as accessed on Feb. 11, 2013.

Mock Shop at http://www.vrsoftware.com/products/vrMockshop_main.html, 2 pages, as accessed on Feb. 11, 2013.

Simstore, http://www.simstore360.se/index.php?id=4, 1 page, as accessed on Feb. 11, 2013.

Quant, http://www.extech.eu/quant/intro, 1 page as accessed on Feb. 11, 2013.

Hall, Jonathon C., "Self-Critique: 'Retail Planogram' Interface", Columbia class Spring 2010; at http://www.wbpaley.com/classes/Columbia/COMS_E6174_Spring10/students/jh2203/10b/selfcrit_jh2203-final.pdf; 17 pages, created May 5, 2010, as accessed on Feb. 11, 2013.

Hall, Jonathan C., Assignment 8—First Draft, "Interface First Drafts" Columbia class Spring 2010; 6 pages, as available at http://www.columbia.edu/~jh2203/comse6147/8/, as accessed Jun. 14, 2012.

\* cited by examiner

| LEAD IN: | | | | | |
|---|---|---|---|---|---|
| DISPLAY SIZE: 3X84 | | | SET DATE: | | |

| Schematic Number | Lead IN | Base IN | FAC | Description | UPC |
|---|---|---|---|---|---|
| Sect 1 | | | | | |
| 1-1  1 | 17.9 | 0.5 | 1 | ISM HDR LPP   FRONT E/C | 490100000464 |
| 1-2  1 | 0.0 | 82.9 | 2 | SIGN BACKER   IT: GENERIC ENDCAP | 490042280506 |
| 1-3  1 | 0.0 | 93.2 | 40 | FXTR AP0031   PEGHOOK9"SCAN TAG BACK | 490040100707 |
| Sect 1 | | | | | |
| 1-P1  1 | A | 1 | 1 | ISM HDR LPP   FRONT B/C | 490010000471 |
| 1-P1  2 | B | 13 | 1 | 1PK SOCK   CIRCO CAMO 0M-6M | 490300630517 |
| 1-P1  3 | F | 13 | 1 | 1PK SOCK   CIRCO CAMO 6M-12M | 490300630524 |
| 1-P1  4 | K | 13 | 1 | 1PK SOCK   CIRCO CAMO 12M-24M | 490300630531 |
| 1-P1  5 | P | 13 | 1 | 1PK SOCK   CIRCO CAMO 2T-3T | 490300630548 |
| 1-P1  6 | T | 13 | 1 | 1PK SOCK   CIRCO EDGE NIGHT 0M-6M | 490300630593 |
| 1-P1  7 | X | 13 | 1 | 1PK SOCK   CIRCO EDGENIGHT 6M-12M | 490300630609 |
| 1-P1  8 | BB | 13 | 1 | 1PK SOCK   CIRCO EDGENIGHT 12-24M | 490300630616 |
| 1-P1  9 | GG | 13 | 1 | 1PK SOCK   CIRCO EDGENIGHT 2T-3T | 490300630623 |
| 1-P1  10 | B | 26 | 1 | 1PK SOCK   CIRCO ALMND BLSSM 0-6M | 490300622215 |
| 1-P1  11 | F | 26 | 1 | 1PK SOCK   CIRCO ALMNDBLSSM 6-12M | 490300622222 |
| 1-P1  12 | K | 26 | 1 | 1PK SOCK   CIRCO ALMNDBLSM 12-24M | 490300622239 |
| 1-P1  13 | P | 26 | 1 | 1PK SOCK   CIRCO ALMNDBLSSM 2-3YR | 490300622246 |
| 1-P1  14 | T | 26 | 1 | 1PK SOCK   CIRCO HETHR TAN 0-6M | 490300622703 |
| 1-P1  15 | X | 26 | 1 | 1PK SOCK   CIRCO HETHR TAN 6-12M | 490300622710 |
| 1-P1  16 | BB | 26 | 1 | 1PK SOCK   CIRCO HETHR TAN 12-24M | 490300622727 |
| 1-P1  17 | GG | 26 | 1 | 1PK SOCK   CIRCO HETHR TAN 2-3YRS | 490300622734 |
| 1-P1  18 | B | 40 | 1 | 1PR CI SOCKS   SHY LAVENDAR 0-6M | 490300622314 |
| 1-P1  19 | F | 40 | 1 | 1PR CI SOCKS   SHY LAVENDAR 6-12M | 490300622321 |
| 1-P1  20 | K | 40 | 1 | 1PR CI SOCKS   SHY LAVENDAR 12-24M | 490300622338 |
| 1-P1  21 | P | 40 | 1 | 1PR CI SOCKS   SHY LAVENDAR 2-3YRS | 490300622345 |
| 1-P1  22 | T | 40 | 1 | 1PR CI SOCKS   REALLY RED 0-6M | 490300622505 |
| 1-P1  23 | X | 40 | 1 | 1PR CI SOCKS   REALLY RED 6-12M | 490300622512 |

FIG 1A

Retailer Planogram Layout

| DISPLAY # | DISPLAY TYPE | | ASSORTED MERCHANDISE | |
|---|---|---|---|---|
| | DISPLAY SIZE: | 24X48 | SET DATE: | 12/10/2011 |

| Location | Fixture UPC | Product UPC | Description |
|---|---|---|---|
| A1 | 061289874213 | 043100752141 | Security Envelopes |
| I1 | 061289874213 | 043100752127 | Mead Envelopes |
| N1 | 061289874213 | 043100752127 | Kraft Velveeta |
| H13 | 061284563248 | 068488049218 | Stick Pen Black |
| M13 | 061284568941 | 068488049225 | Stick Pen Blue |
| P16 | 061284563248 | 076670207513 | Expressions Paint Brush |
| R16 | 061284563248 | 076670207513 | Expressions Paint Brush |
| U16 | 061284563248 | 884118055578 | Plastic Candle Light |
| C20 | 061284584912 | 016346301152 | Spatulas |
| H20 | 061284563248 | 603250038108 | Jumbo 8CT Crayons |
| L20 | 061284563248 | 603250038108 | Jumbo 8CT Crayons |
| H26 | 061284563248 | 603250036333 | 24 CT Crayons |
| L26 | 061284563248 | 603250036333 | 24 CT Crayons |
| P33 | 061284563248 | 724328920184 | Jumbo Highlighter |
| U33 | 061284563248 | 884118055578 | Plastic Candle Light 5 IN |
| H34 | 061284568941 | 071980000267 | Ruban Tape 3/4 inch wide |
| L34 | 061284568941 | 071980000267 | Ruban Tape 3/4 inch wide |
| B35 | 061284584912 | 048676990263 | Utility Knife |
| E35 | 061284563248 | 048676990263 | Utility Knife |
| H40 | 061284568941 | 071980392027 | Transparent Tape 3.472 SF |
| L40 | 061284568941 | 071980392027 | Transparent Tape 3.472 SF |
| B47 | 061284568941 | 048676990270 | Paring Knife |
| E47 | 061284568941 | 048676990270 | Paring Knife |
| I47 | 061284563248 | 884118055578 | Plastic Candle Light 5 IN |
| O47 | 061284568941 | 400220165679 | Santa Blinking Stake |
| U47 | 061284568941 | 400220165679 | Santa Blinking Stake |

FIG 1B

PROJECTED IMAGE PLANOGRAM SYSTEM

TECHNICAL FIELD

The invention relates generally to retail displays, and more particularly, to planograms used in displaying merchandise in a retail display.

BACKGROUND

The retail industry uses a process called planogramming for creating and communicating the design of a merchandise layout within a given category to be replicated at multiple retail locations. Typically created by corporate management or other centralized decision-makers, a planogram is an illustration, drawing, or instructions showing where products should be placed on pegboard or other display background surfaces. It also details what fixtures, shelves, hooks, or other product display holding equivalents are used for displaying these products.

Retailers use planogramming to direct and influence consumers' purchases by creating merchandise displays that are well organized and visually appealing. The goal of planogramming is to increase sales and profits. Planogramming both improves the customer's shopping experience and influences customer behavior to encourage trade-up and impulse purchases. For retail corporate management, the planogram is utilized as an information conveyance tool with the goal of ensuring that merchandise in their retail locations is set for display exactly as planned at the corporate headquarters. For employees in these retail locations, the planogram is used as a specific instruction for setting up the merchandise displays.

Planogramming is one of the more costly payroll functions in retail. Planograms are typically created at the corporate level, usually in corporate planogram rooms, by highly paid Senior Buyers, Corporate Planners, Divisional and Senior V.P.s. Their time is invested to make sure every item in their stores is displayed in a manner that maximizes its sales potential. Management undertakes this expensive enterprise with the expectation that the optimal merchandise display they approved will be replicated in each of their stores exactly as created in their corporate headquarters.

In current practice, once the planogram is approved by management, a bar code is attached to each merchandise item displayed. These bar codes are then scanned using a hand held bar code reader to record the merchandise in the planogram. Next, peg holes are counted to establish the placement of fixtures and merchandise within the display pegboard and reflected in the planogram. This information is detailed in a paper document of the planogram, which is then distributed to stores for implementation. FIGS. 1A and 1B depict the traditional paper planograms received by individual retail stores.

Store employees use the paper planogram document to physically set the merchandise display. These merchandise displays are typically set when stores are closed, by hourly employees working late into the night, using methods that typically involve manually counting peg holes to determine fixture and merchandise placement, in an effort to recreate the planogram layout determined by corporate. Thus, display setting using traditional paper planograms is time-consuming and costly.

Further, the existing process used by retailers for setting planograms leaves much room for error in recreating the merchandise display in the store. An error in the placement of one fixture when setting the planogram can make the entire planogram incorrect. Many times this error is not realized until the employee is near the end of setting the planogram, at which time the employee discovers that merchandise to be displayed will not fit in the available area remaining. To correct the error, the employee must strip merchandise and fixtures already set and reset them in their proper locations. This setting and re-setting of the planogram adds additional time, increasing labor costs for the retailer.

Therefore, there is a need for an efficient, precise system for setting fixtures and merchandise in retail locations based on planograms that are set in a location other than the retail location.

SUMMARY

Embodiments of the present application substantially meet the aforementioned needs of the industry. In an embodiment, the Projected Image Planogram System (hereinafter "PIPS") is an automated display planning and implementation system used in planogramming.

In an embodiment, the Projected Image Planogram System uses a camera, projector, code reader, illuminated images and a specialized computer program to store planograms as designed, communicate these planograms to retail locations, and provide an easy to use system insuring that the planograms are recreated as originally conceived.

By accessing readable or other scannable codes assigned by retailers, manufacturers, or planogram creators for each fixture and corresponding merchandise attached to that fixture within the planogram, such as, but not limited to, UPC codes, DPCI codes, or other readable code, the PIPS system combines these readable code data to create a unique QR code. This unique QR Code is used for storing and communicating fixture and merchandise data information, as well as the fixture and merchandise placement locations within the planogram. An image of the completed planogram, as well as images of the locations for both fixture and merchandise, is taken at the corporate planogram room where the planogram is designed. At store locations the PIPS system is used to re-create the planogram exactly as designed by corporate. This is done in two ways, one—by projecting the image of the finished planogram on the pegboard being set, two—by identifying merchandise and fixtures displayed on the planogram, illuminating their exact location within the planogram by using a bar code reader or by accessing other database(s) interfaced with the PIPS system.

Embodiments of the PIPS system provide a more accurate method for recording and conveying the corporate planogram design to their retail stores. In the stores this system facilitates a more efficient, less expensive and more accurate installation of the planogram. This planogram system reduces the risk of misinterpretation and human error, assuring an exact duplication of the corporate planogram design in every store location where the planogram is set.

In embodiments, at the planogram planning site, a planogram is physically set in a corporate planogram room, for example. Often, the physical and manual setup of a planogram provides executives a thorough look at the proffered display, as it can be seen by the planners as it will be seen by customers. Once the planogram is physically set, a photographic image is recorded of that completed planogram. The readable codes for each item of merchandise and the fixture on which that merchandise is displayed (peg hook, shelf, divider, hanger, etc.) can then be scanned and merged together by the PIPS computer program to create a unique QR code. Each unique QR code incorporates all readable code data on the item of merchandise displayed and its corresponding fixture. A readable version of both the merchandise and fixture readable code is embedded in the QR code to aid in planogram set up at store locations and for inventory tracking purposes.

The unique QR code label is attached to the pegboard directly above the pegboard holes on which the fixture is mounted. The fixture and its corresponding item of merchandise are then removed from the pegboard. In a planogram with a shelf displaying multiple items of merchandise a similar procedure is used for attaching QR codes. The unique QR code sticker for each item of merchandise, which also identifies the shelf, is attached to the pegboard directly above the shelf at the location where that merchandise item is displayed. After all the unique QR codes for the merchandise displayed on the shelf have been attached, the shelf is removed.

The above-described procedure for reading merchandise and fixture data, creating and attaching unique QR code labels, and removing merchandise and fixtures from the planogram is repeated for each item of merchandise displayed and its corresponding fixture until all merchandise and fixtures have been removed from the pegboard and only the unique QR codes remain.

QR code data is collected by using a digital camera to photograph each pegboard section of the planogram. The photograph is sent to the PIPS computer program which stores the merchandise and fixture data and the specific location information for the display of that merchandise and corresponding fixture within the planogram.

To ensure accuracy in future projections of the planogram in retail stores, after the planogram fixture and merchandise QR code information is stored in the PIPS system, the planogram can be projected back on to the pegboard to confirm that the projected positions of the beams of light for all fixtures and merchandise lines up with location of the corresponding QR code. Any projected position that does not line up with the location of the corresponding QR code may be manually adjusted or moved within the PIPS system to correct the relative locations. After these corrections are made, the planogram is then finalized in the PIPS system and is ready to be sent to the stores.

This manual entry feature for QR codes adds flexibility and usability to the PIPS system. This function can be used to confirm QR codes retrieved by the camera or to change a QR code after the planogram has been photographed or imaged and finalized in the planogram room. The manual entry feature also accommodates differences in camera lens distortion or quality of camera. The manual feature for entering QR codes can also be used to construct an entire planogram without the use of a camera, as is described below.

In an embodiment, the planogram as set by the corporate planner(s) can be tweaked or modified based on automatic customization algorithms. In one embodiment, the PIPS system can interface with point-of-sale aggregators for particular stores or particular regions. For example, if one of the items of merchandise set in a planogram sells at a higher rate in a particular store or particular region to which the planogram is to be sent, the space in the planogram can be increased relative to the weakness of sales of other items of merchandise in that planogram. Consider boxed item A is given 2 rows of shelf space as set by the corporate planner(s) and boxed item B is given 3 rows of shelf space, as set by the corporate planner(s). The PIPS system interfaces with a point-of-sale aggregator to calculate that item A sells at a higher rate than item B for the particular store or particular region. The planogram can then be modified to give one additional row of shelf space to item A, which is taken from item B. Myriad algorithms can be implemented to determine the relative sales and corresponding modifications to the planogram at a particular store or region for two or more products, as understood by a person skilled in the art.

In another embodiment, the planogram can be customized to individual stores based on the size of the individual stores' retail space or uniqueness of the individual stores' retail space. For example, the PIPS system can interface with a database of each of the individual stores' display space measurements. Once the planogram is set by the corporate planner(s), the system can resize or tailor the planogram based on data downloaded for a particular store. If one store has room for only three shelves instead of the expected four shelves, the merchandise and fixtures in the planogram can modified appropriately, using scaling algorithms or replacement algorithms, if appropriate.

In another embodiment, the planogram is not created manually at a physical planogram planning site, but is instead created virtually. Planning professionals can individually or collaboratively use system software to create customized planograms. Layouts of any desired merchandising display can thereby be virtually created, thus applying the aforementioned steps of manually setting up the planogram to a virtual environment. This may be via collaboration online or via a networked system or individually by a particular planner at a single or combination of system terminal(s).

In an embodiment, each item of merchandise and the fixture on which that merchandise is displayed (peg hook, shelf, divider, hanger, etc.) can be virtually accessed or selected and subsequently virtually manipulated to be in a desired position. Once the planogram is virtually defined, a virtual image is recorded of that completed planogram. As the details of each item of merchandise and the fixtures on which the merchandise is displayed will be known or accessible by the system, PIPS system can merge the respective data to create a virtual coding. In an embodiment, the output of the virtual planogram is equivalent to the imaged physical planogram display, having readable codes for each item of merchandise and fixturing, which can then be merged to create a unique QR code for the merchandise and fixture. In another embodiment, the virtual planogram output has only unique QR codes, thereby skipping the step of merging the readable codes for each item of merchandise and fixturing.

Each unique QR code, just as in the physical planogram implementation embodiment, incorporates all readable code data on the item of merchandise displayed and its corresponding fixture. A readable version of both the merchandise and fixture readable code is embedded in the QR code to aid in planogram set up at store locations and for inventory tracking purposes. The unique QR code label is then virtually attached to the planogram image output directly above the virtual pegboard holes on which the virtual fixture is mounted. In embodiments, the output can be simply the display image, properly encoded with QR codes, or can also incorporate fixturing and/or portions of merchandise, as selected by the user. Just as in the physical setup embodiment, the image of the planogram is generated and is dimensionally correct relative to the display base.

In another embodiment, the system accepts as an input a planogram image other suitable planogram file created outside of the PIPS system. In such an embodiment, the inputted planogram image or other planogram file can be created by any number of commercially available planogramming software products or other virtual applications or web-based interfaces. Once the planogram image is input, the PIPS system uses image recognition algorithms to identify fixtures and merchandise within the image. In another embodiment, the inputted image can contain identifying code data to identify each fixture and piece of merchandise within the planogram. Other suitable identifying procedures or algorithms are also contemplated. Each fixture and piece of merchandise is then identified and a unique QR code for the merchandise and supporting fixture can then be generated.

From the corporate headquarters, or virtual environment location, as appropriate, the planogram is electronically sent to the stores where the planogram is to be set. Physical delivery of an electronic copy of the planogram is also possible. For example, a flash drive, writable disc (CD, DVD, etc.), portable hard drive, or any other storage means can comprise the planogram data and likewise be delivered to individual stores. At the stores, the planogram program is loaded into a laptop computer with a short throw projector and code reader attached (such as a UPC bar code reader or other suitable scanner), which is placed in the store aisle in front of the pegboard where the planogram is to be set.

In embodiments, at the store site, the first step in using the planogram program is to set the calibration of the projector with the pegboard. Once the pegboard is completely covered with projected light from the projector, calibration is performed by clicking on the four outermost peg holes on the pegboard section using a mouse and cursor. Other appropriate calibration methods are also considered.

Once calibrated, store employees can optionally project a full size photographic image of the completed planogram as created at corporate on their store peg board, showing what the planogram will look like.

Next fixtures are attached to the pegboard. The program projects beams of light identifying on the pegboard the location at which the fixtures used in the planogram are to be placed. In an embodiment, this is done via a store employee scanning the code of the various fixtures using a readable code reader, such as, but not limited to, scanning a bar code using a bar code reader. The fixture location is then highlighted on the pegboard using a colored beam of light. Store employees then attached the fixtures used in the planogram at their identified locations. For fixtures not included in the specific display, no location illumination is provided. In other embodiments, the projector can display a message to the store employee stating that the scanned fixture is not included in the display.

Once all fixtures have been physically attached to the pegboard, store employees then set the merchandise on the planogram. In an embodiment, using a readable code reader similar to the fixture setting described above, a store employee can scan the readable code on an item of merchandise. The planogram program uses this readable code scan to identify that item of merchandise and the location within the planogram where that item is to be displayed. This location is highlighted on the pegboard by a projected colored beam of light. The item of merchandise is then physically set on the appropriate corresponding fixture on the pegboard. This process is repeated until all merchandise items have been identified and placed on the pegboard at their appropriate location. Further, similar to the fixture setting described above, for merchandise not included in the specific display, no location illumination is provided. In other embodiments, the projector can display a message to the store employee stating that the scanned merchandise is not included in the display. In a feature and advantage of embodiments of the invention, a method of recording a planogram or display model or wall display as designed or established in a planning location is described. In embodiments, the planogram or display or design is recorded by use of a digital camera or similar recording device. Embodiments can be utilized not just in the retail store context, but in all applications wherein a design is established in one location and is recreated in another or in multiple other locations.

In another feature and advantage of embodiments of the invention, product identification and fixture identification can be established by reading readable codes on the product and fixture by the use of a bar code scanner or other equivalent, or by assessing data bases containing product and fixture information.

In another feature and advantage of embodiments of the invention, embodiments merge readable code data such as UPC bar code data or equivalents obtained from scanning or accessing other databases to produce a printed or virtual QR code which incorporates both the merchandise information and the fixturing on which said merchandise is displayed. In embodiments, QR codes can be printed by use of a QR code printer, a computer printer or other equivalent device. QR codes can be attached to the pegboard, being placed at appropriate locations to identify merchandise and fixture set at such locations. Likewise, QR codes can be virtually attached to the proper location within a virtual planogram image.

In another feature and advantage of embodiments of the invention, locations of merchandise and fixtures within the planogram or display section are recorded by use of a digital camera or other similar or equivalent method of recording and storing for later use, such QR code information.

In another feature and advantage of embodiments of the invention, the planogram is created virtually within the PIPS system. Planning professionals can individually or collaboratively use system software to create customized planograms that can subsequently be displayed at the retail store, equivalent to designs by manual planograms.

In another feature and advantage of embodiments of the invention, the system accepts as an input a planogram image created outside of the PIPS system. The PIPS system uses image recognition algorithms to identify fixtures and merchandise within the image.

In another feature and advantage of embodiments of the invention, the information and images recorded are sent to other locations for recreation.

In another feature and advantage of embodiments of the invention, at the retail store or other environment where the planogram or design is to be set or recreated, a computer with projector attached displays on the pegboard or the display surface area. In embodiments, the display can include: an image of the completed planogram or design, illuminated shapes or images identifying fixture type, illuminated shapes or images identifying fixture locations, illuminated shapes or images identifying merchandise to be displayed, illuminated shapes or images identifying merchandise locations, and illuminated shapes or images identifying other items used or incorporated within the design. The illuminated shapes or images may incorporate the use of numerous colors, shapes, designs, textures, photographic images or other equivalents for delineation or identification.

In another feature and advantage of embodiments of the invention, illuminated images are highlighted on the peg board, wall or on any other display surface where a design is being recreated. Specific image locations are identified by use of a bar code reader or similar device, or by accessing corporate or other auxiliary databases, or by other means that accesses readable code data to identify merchandise, fixturing, or other items used in the design or planogram. The invention identifies and illuminates the exact location where that merchandise, fixture or other item used is to be set within the planogram or design.

In another feature and advantage of embodiments of the invention, in retail store applications embodiments allow for the setting of fixtures and displaying merchandise within a planogram when constructed at store level to be an exact replication of the original planogram as conceived, designed and approved by senior management in the corporate location.

In another feature and advantage of embodiments of the invention a synchronized multiplicationary application is provided so that when an area of display is composed of multiple sections, embodiments can be incorporated into one planogram using multiple computers, cameras, projectors, bar code readers. Alternatively, multiple sections can be incorporated by the PIPS software after multiple pictures are taken with a single digital camera.

In an embodiment of the invention, a laptop-controlled projector provides a set-up image directly on a store fixture, thereby providing store personnel directions for stocking product on the fixture. In an embodiment of the invention, the laptop calibrates the set-up image for the fixture, thereby presenting a location template as an image projected on the fixture. In an embodiment of the invention, alignment positions are provided on the fixture, such as corners or markings on the fixture which are utilized to position the image and/or for calibration.

In an embodiment of the invention, a portable projector on a stand projects a merchandise stocking template directly on a store fixture to be stocked or set up. In an embodiment of the invention, store personnel attach fixture appliances (hooks, shelves, bins) positioned by way of reference to images cast directly on a store fixture by a projector. In an embodiment of the invention, a projector casts a still image on a fixture showing fixture appliance locations on a fixture. In an embodiment of the invention, a projector casts a still image on a fixture showing merchandise stocking locations on the fixture.

In an embodiment of the invention, store personnel stock merchandise directly on a store fixture in accord with a transitory image projected on the store fixture illustrating merchandise placement.

In an embodiment of the invention, a store fixture has a transitory image thereon providing location information for fixture appliances and/or merchandise. In an embodiment of the invention a store fixture has transitory location designations for fixture appliances and/or merchandise.

In an embodiment, the present invention provides a method of combining a fixture code and a merchandise code to create a combined code for efficient, streamlined processing. The method comprises accessing a fixture code database, the fixture code database containing individual fixture data, accessing a merchandise code database, the merchandise code database containing individual merchandise data, and generating a combined code, the combined code including the individual fixture data and individual merchandise data. In another embodiment, the combined code includes data defining the placement location of the item of merchandise and/or the placement location of the fixture.

In an embodiment, the present invention provides a method of processing individual combined codes within an image containing a plurality of combined codes, the method comprising receiving a real-world size of the image as taken on a physical space, receiving an image containing a plurality of combined codes, decoding each of the plurality of combined codes to obtain a location and size of each of the plurality of combined codes, converting the location and size of each of the plurality of combined codes to real-world location and size based on the received size of the physical space.

In an embodiment, the present invention provides a method of relating a virtual image to a physical space having known dimensions, the method comprising calibrating an image capturing device, capturing an image, relating the calibration to the image, and determining the relative locations of items in the image with respect to the physical space by applying the image to the dimensions of the physical space.

In an embodiment, the present invention provides a method of projecting an image of a first location at a second location via a projector, the method comprising capturing a calibrated image of a first location by an image capture device, calibrating the projector by selecting each of the four corners of the second location, relating the four corners to the image by estimating a homographic perspective transformation from physical units of the second location to pixels of the projector, and converting pixels of the image capture device to pixels of the projector. In an embodiment, the dimensions of the first location are different from the dimensions of the second location. In an embodiment, the calibrated image includes estimating a homographic perspective transformation from physical units of the first location to pixels of the projector.

In an embodiment, the present invention provides a method of highlighting a location on a projected image, the method comprising scanning a barcode of an item, searching a planogram file for the scanned item, reading, from an item database, the size of the item, converting image pixels to projector pixels with respect to the size of the item to create a converted shape, and projecting the converted shape. In embodiments, the item database can be a fixture database. In embodiments, the item database can be a merchandise database. In embodiments, the projected converted shape can be colored.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 1A and 1B are illustrations of traditional paper planograms generated by corporate display planners and received by individual retail stores.

Figure 2A:
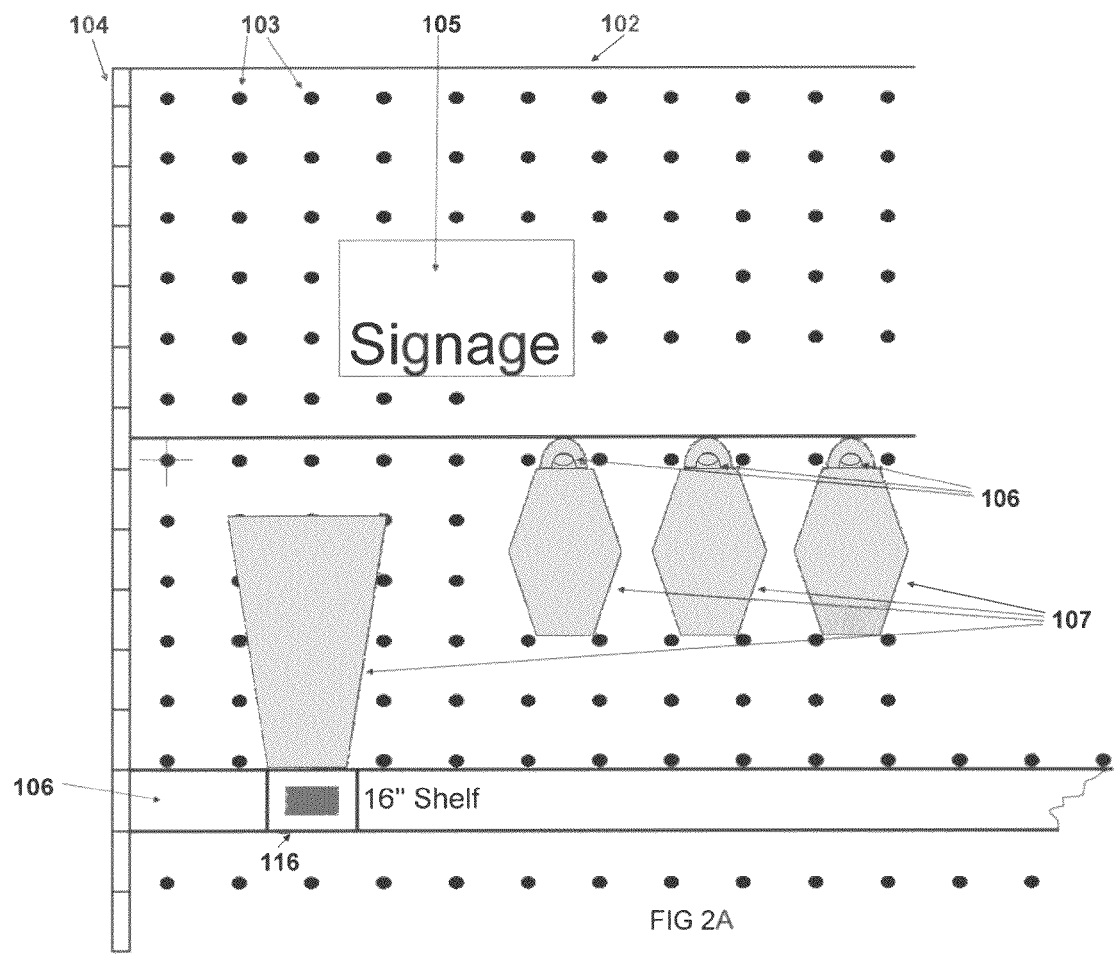
FIG. 2A is an illustration of a section of a planogram with merchandise and fixtures set in the corporate planogram room, according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Figure 2B:
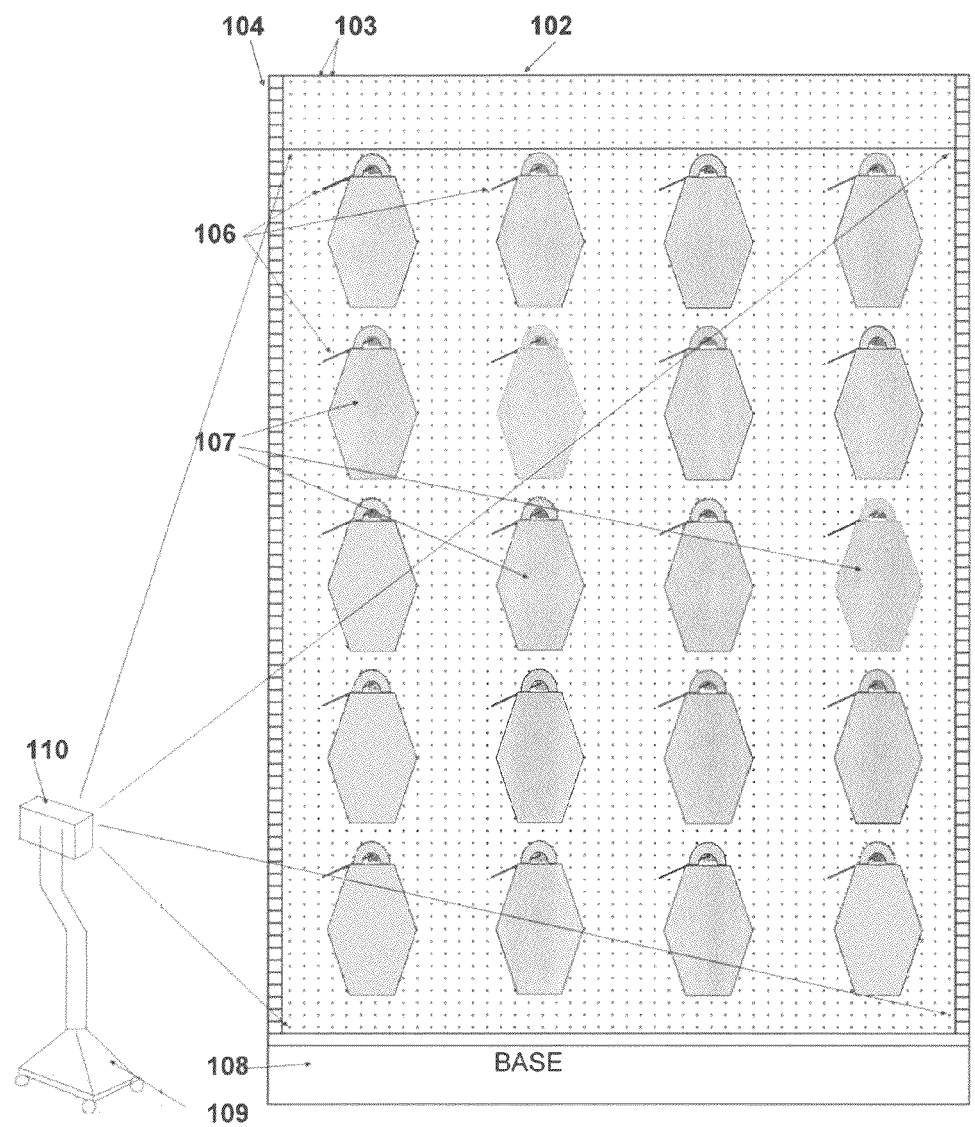
FIG. 2B is an illustration of a camera taking a photo image of the planogram with merchandise and fixtures set, according to an embodiment.

A more detailed description of the various embodiments of the present invention is provided with further references in the drawings beginning with FIG. 2A, a depiction of a store display pegboard section 102 with holes having the usual alignment of 1" spacing both vertical and horizontal 103 with a metal stanchion 104. Store signage 105 for marketing is attached across the top of the display pegboard 102. Embodiments show fixtures 106 for displaying merchandise including a metal shelf 106 and peg hooks 106 with merchandise 107 displayed on the shelf 106 and hanging merchandise 107. FIG. 2B depicts the display framework base 108 and a digital camera 110 used to photograph the various aspects of the planogram as set in the corporate planogram room including the merchandise 107 hanging on the pegboard 102 via fixture hooks 106 inserted into pegboard holes 103. Camera 110 also records an image of the completed planogram as physically set in the corporate planogram room. Optionally, camera 110 is held stationary during photographing by the use of an adjustable stand 109.

Figure 3:
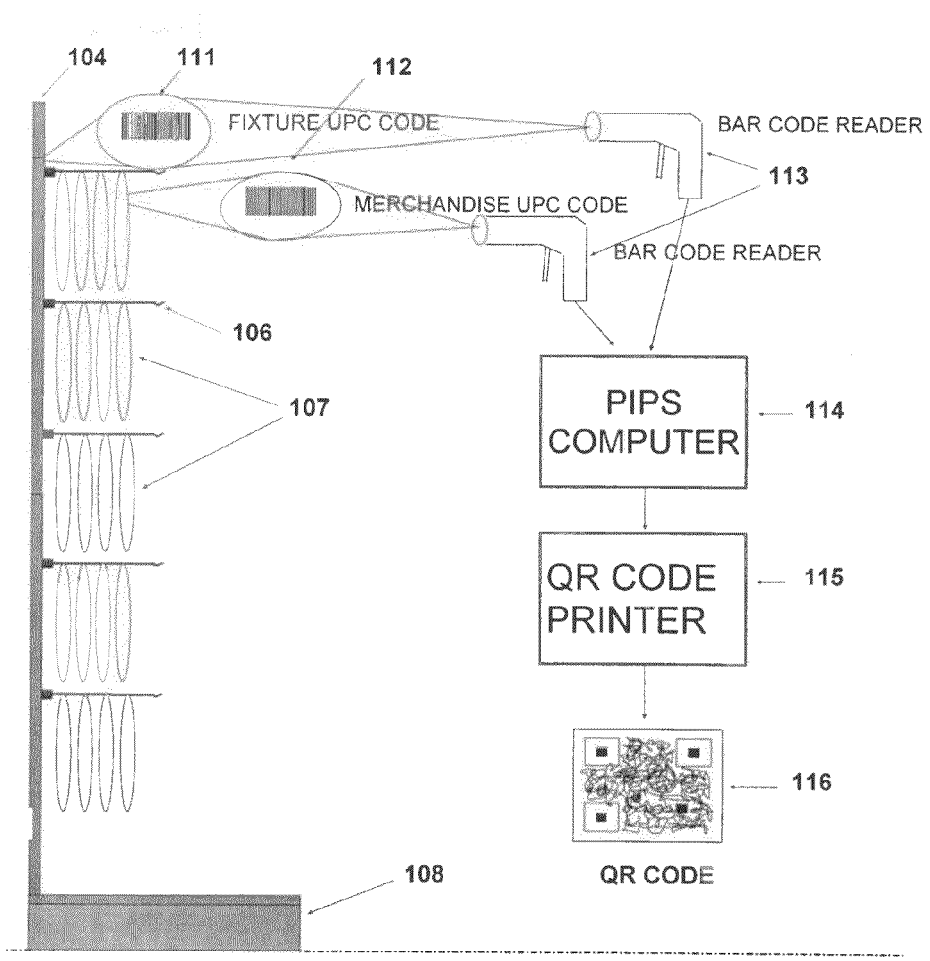
FIG. 3 is an illustration of a QR code creation step showing fixture and merchandise UPC codes scanned by a bar code reader, with a QR code creation device to output a peelable adhesive-backed QR code suitable for attachment to pegboard display at appropriate locations, according to an embodiment.
Figure 4:
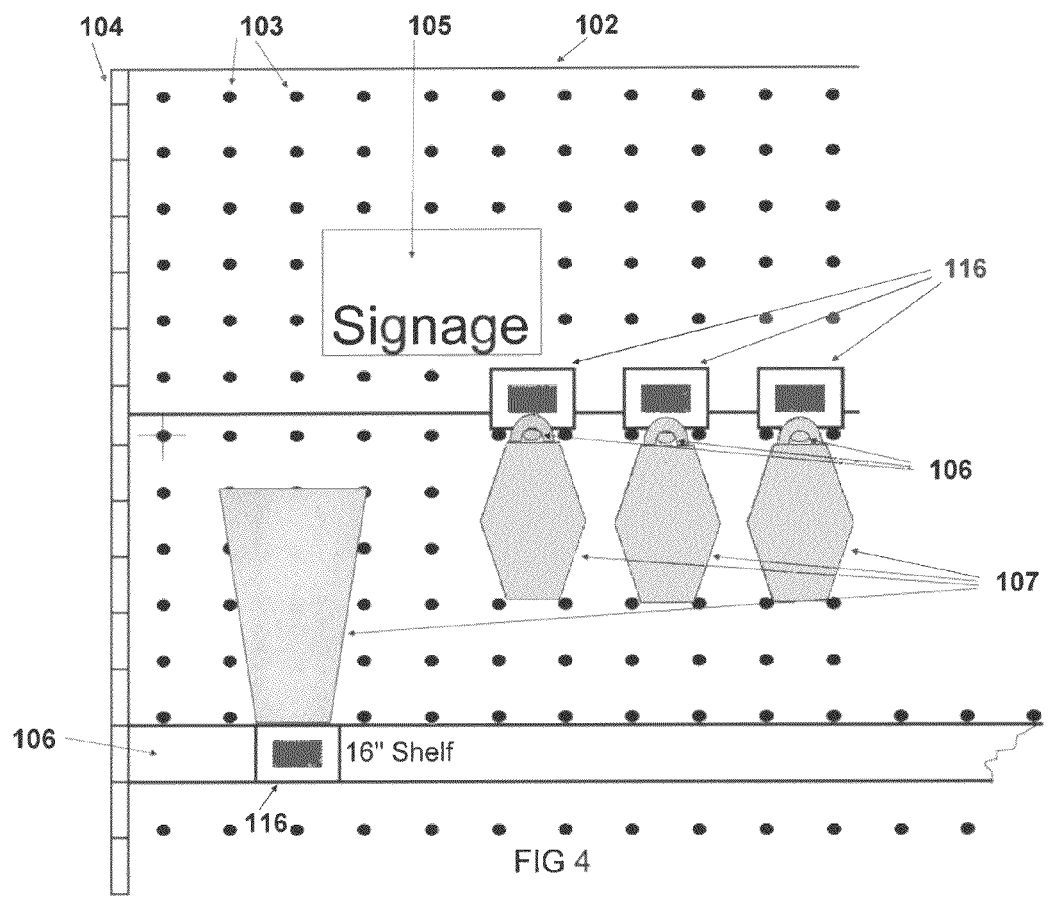
FIG. 4 is an illustration of a planogram with fixtures installed, merchandise displayed, and QR codes appropriately attached, according to an embodiment.
Figure 5:
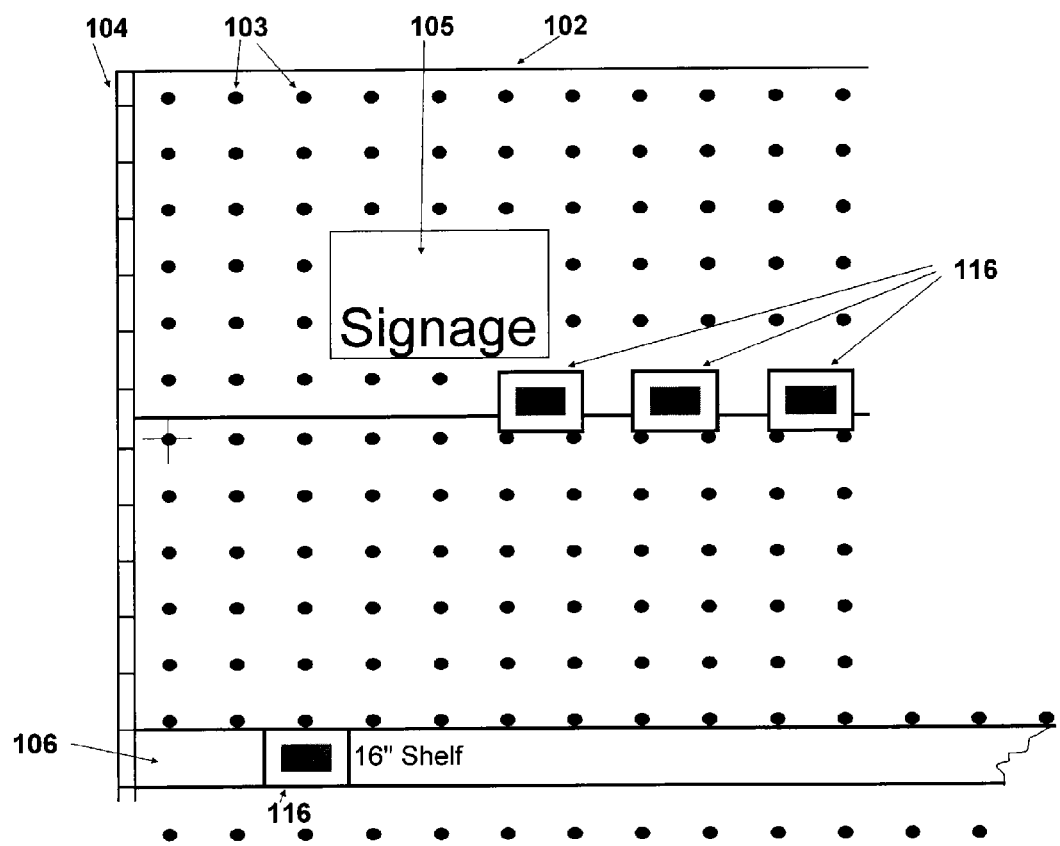
FIG. 5 is an illustration of a planogram with only QR code labels attached, according to an embodiment.

Referring now to FIG. 3 the display base 108 supports the stanchion 104 holding the pegboard 102 (not shown in this side view) in place for the display of merchandise 107 on peg board hooks 106. Fixture readable codes 111 are embedded in the fixture at manufacturer or attached to fixture in planogram room or accessed from the corporate fixture data base. Merchandise readable codes 112, created by manufacturer or retailer, are affixed to the merchandise displayed, or accessed from the corporate merchandise data base. A handheld bar code reader 113 first reads a fixture readable code 111 then reads a merchandise readable code 112. The paired scanning of fixture and merchandise readable codes are combined in the PIPS computer program 114 which creates a unique QR code 116, which can be printed with an adhesive back by a QR code printer 115. In an embodiment, the printed adhesive backed QR codes 116 in FIG. 4 are attached to the display pegboard 102 immediately above the peg holes 103 holding a peg hook fixture 106 on which merchandise 107 is displayed and on the pegboard immediately above the top edge of a shelf fixture 106 on which the merchandise 107 is stacked or arranged for display. In FIG. 5, once the QR codes 116 are affixed to the display pegboard 102 at their appropriate locations the merchandise 107 and fixture 106 are removed from the set planogram.

Figure 6:
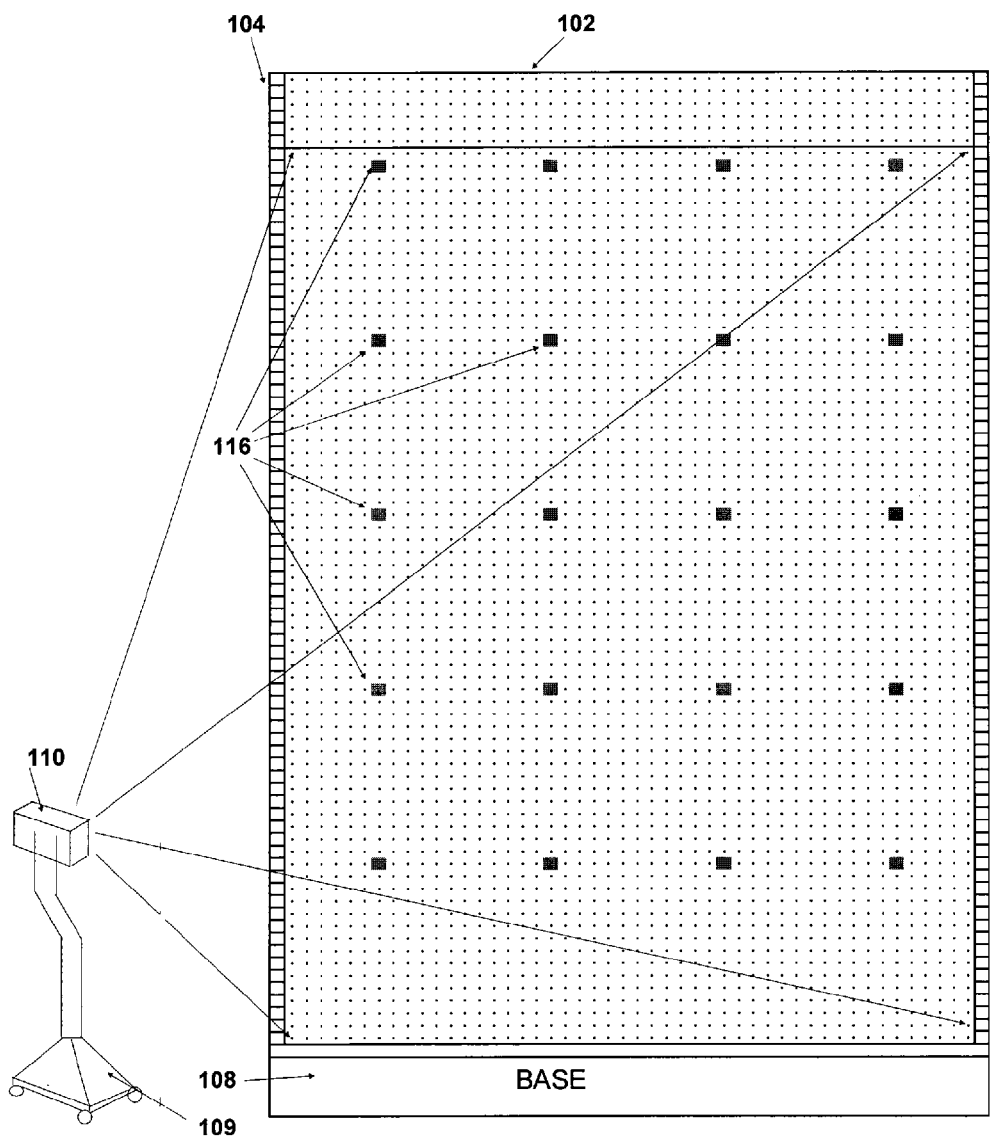
FIG. 6 is an illustration of a camera collecting a photo image of a planogram with only the QR code labels attached, according to an embodiment.

FIG. 6 shows the digital camera 110 recording in a photographic manner the QR codes 116. By a single digital image, all QR codes 116 can be captured. In other embodiments, a series of digital images are taken via digital camera 110, where each image depicts a portion of the entire display or display pegboard 102, for example. The series of images can subsequently be laced or stitched or overlaid together to capture all of the QR codes of the display.

Figure 7A:
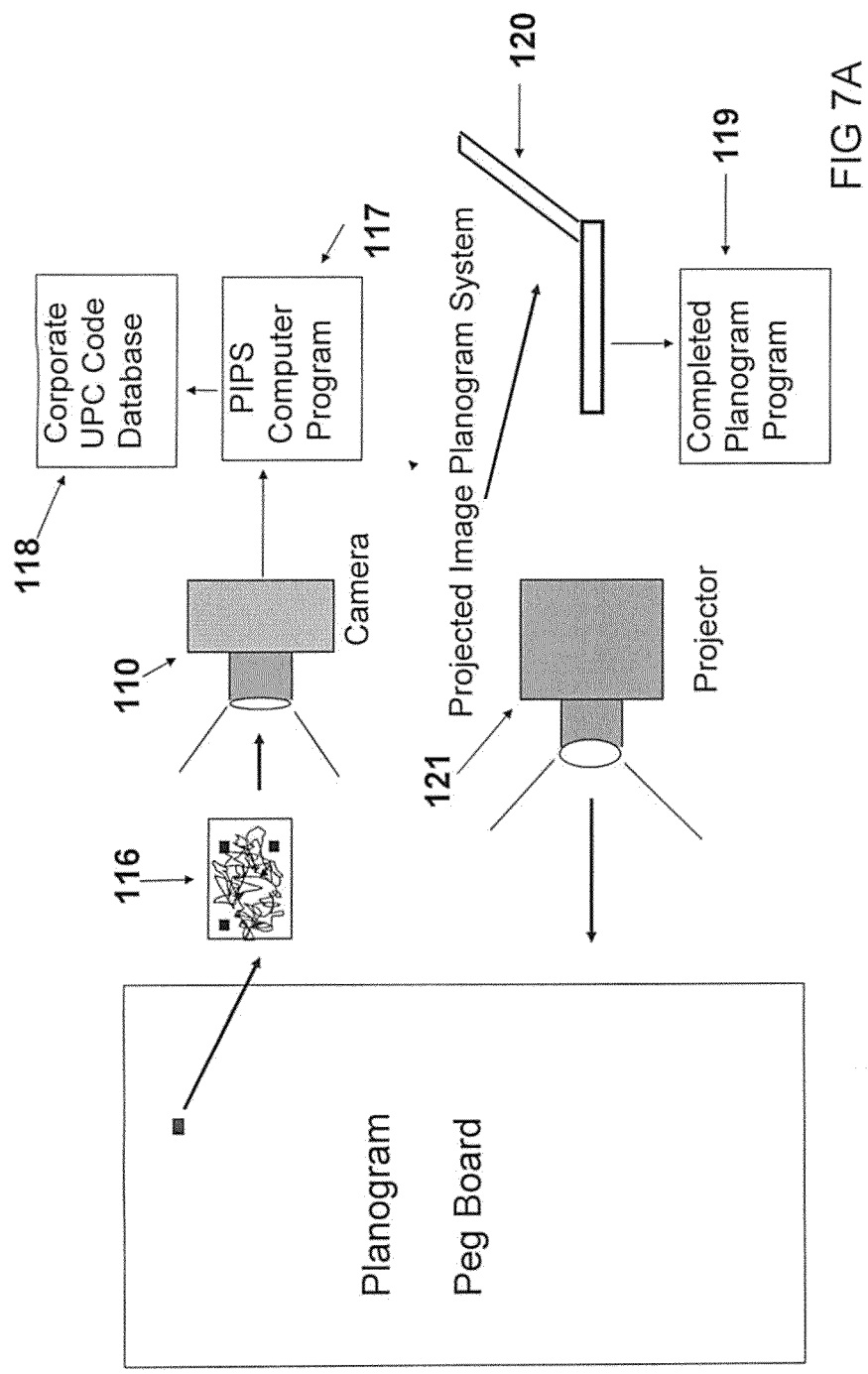
FIG. 7A is an illustration of data collection and data combination processes according to embodiments of the passage of information collected by the camera as photo images of the QR codes and the fully set planogram of FIG. 2A, according to an embodiment.

Referring to FIG. 7A, a photographed image of the set planogram with QR codes 116 is sent to the PIPS computer program via camera 110. The PIPS computer program also accesses the retailer's corporate database to retrieve readable code information on the merchandise and fixtures used in the planogram. A PIPS computer planogram program 117 of the specific planogram as set is created by the PIPS computer program.

Once the PIPS computer program receives the photographed image of the set planogram, accesses the corporate database 118 to retrieve readable code data, and all other algorithms have been completed to create an initial planogram, the initial planogram can be projected back on the pegboard (with QR codes still attached) on which the physical planogram was originally set. Within this projection, each individual beam of light corresponds to a set QR code location. If any of the projected beams of light do not align to their corresponding QR code locations a Manual Adjustment Feature in the PIPS Computer Program is used to correct the misalignment. This adjustment can be made via program 117 by use of a mouse or keystroke. Once all QR code locations are aligned, the PIPS Planogram Program is completed and sent to disk.

This Manual Adjustment Feature makes it possible to make individual QR code changes, during or after the Planogram has been completed (i.e. change of merchandise color, etc).

Figure 7B:
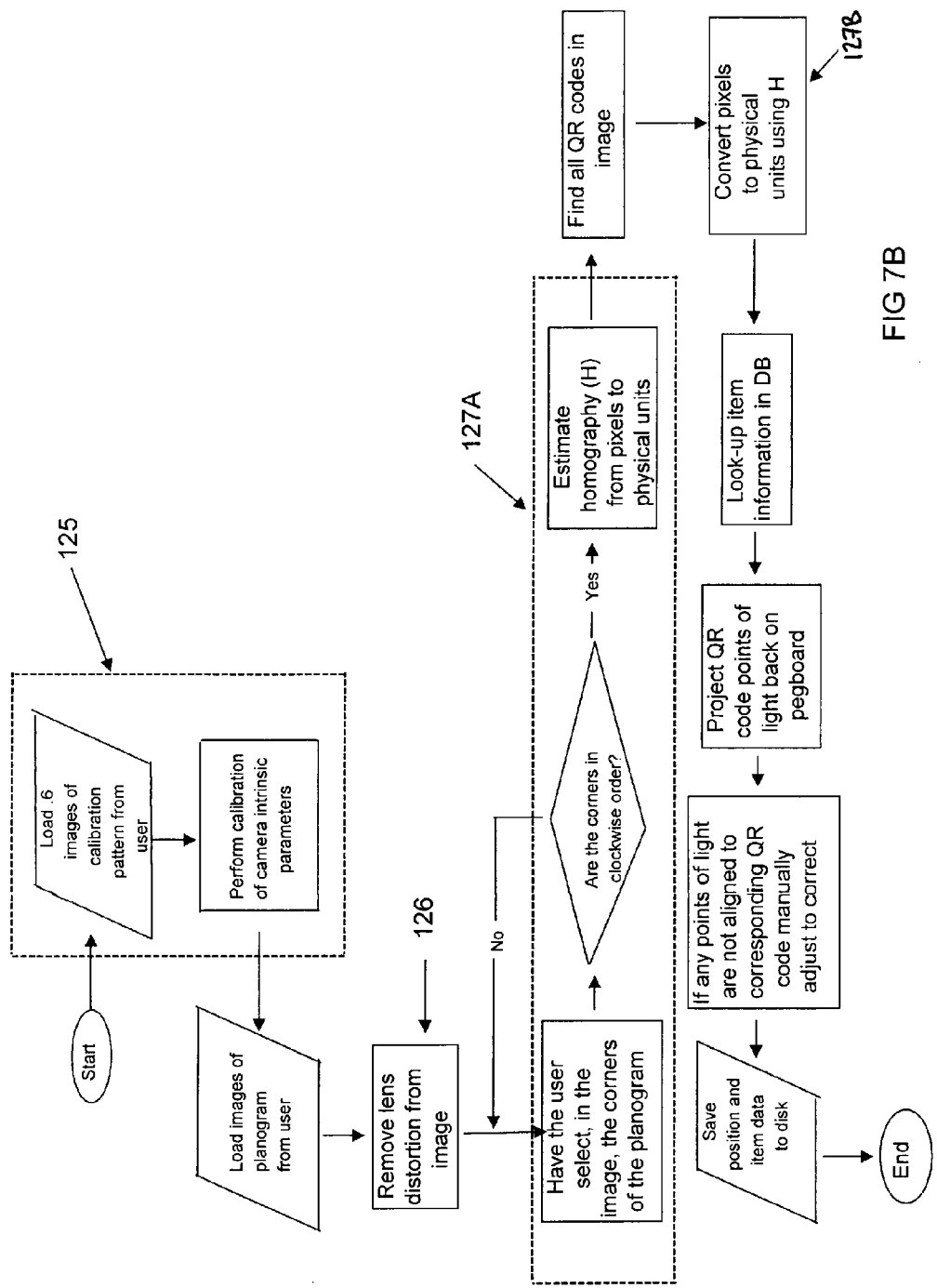
FIG. 7B is a flowchart of an algorithm of the PIPS computer program used at the centralized, corporate location, according to an embodiment.
Figure 7C:
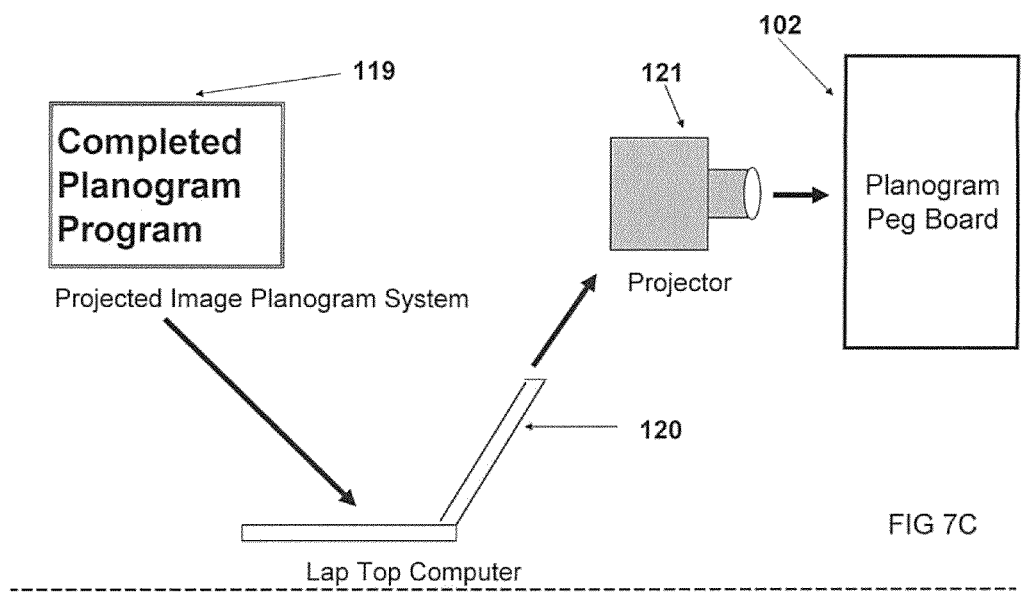
FIG. 7C is a flowchart of a completed planogram projected back on the planogram pegboard, according to an embodiment.
Figure 7D:
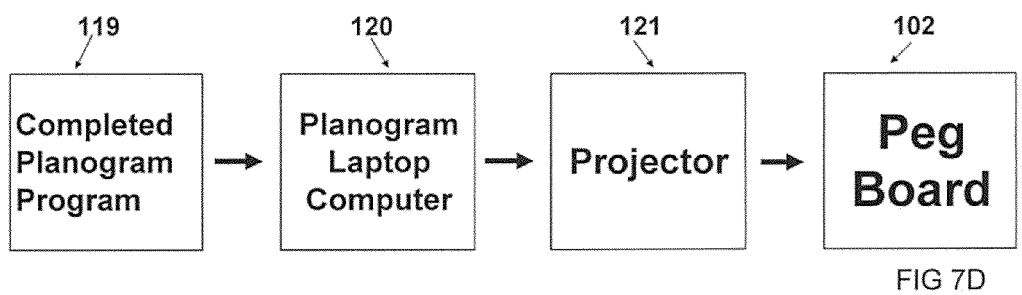
FIG. 7D is a flowchart of a PIPS computer planogram program sending the completed planogram to the corporate computer for projection back onto pegboards in the corporate planogram room, according to an embodiment.

Specifically, in FIG. 7B the QR codes 116 are sent to the PIPS computer program 117. The flowchart of FIG. 7B illustrates the algorithm of the PIPS computer program 117 used in the corporate planogram room and details the process shown at FIG. 7A.

In embodiments, PIPS computer program 117 software uses OpenCV, ZXing and ZBar libraries to implement various computer vision algorithms. In embodiments, database implementation can be by Debea or SQLite libraries.

Referring to FIG. 7B, the PIPS computer program 117 is calibrated at 125 to remove lens distortion 126. In an embodiment, this is done by analyzing several images of a checkerboard pattern using the OpenCV library. It is at its core a non-linear least squares optimization, which in the end gives the camera focal length and more importantly the parameters of any radial or tangential distortion present in the lens. At 126, when the image or images of the full planogram and the planogram board with just the QR codes is presented, the radial and tangential distortion can be removed since the parameters have been calibrated. This allows treatment of the images as if the images were taken with a perfect pinhole camera.

The image is checked to ensure that the entire planogram image has been captured, including the corners 127a which are used for calibration. In an embodiment, since the camera is now assumed to be a perfect pin-hole camera, by selecting the four corners, a homographic perspective transformation can be defined from the image into a common space defined by the size of the planogram (which was entered in inches). In practical results this creates a rectangular image that exactly matches the dimensions of the planogram from the input image, even if in the input the planogram is a parallelogram because the image was taken at an angle.

The information embedded in the QR codes 116, which includes readable codes for fixtures 111 and merchandise 112 and other fixture and merchandise information, is read and within the PIPS computer program the QR code locations are transformed from pixels to physical units 127b. In an embodiment, now that a rectangular image has been defined with radial, tangential, and any keystoning/parallelogramming removed, it is passed on to the ZXing image library which decodes the QR codes in the image.

In an embodiment, the image is not passed on to the ZXing image library, but is instead passed on to the ZBar library. As is known in the art, ZBar algorithms make linear scan passes over an image, treating each pixel as a sample from a single light sensor. The data is scanned, decoded and assembled on the fly. ZBar further abstracts this idea into a layered streaming model. Other imaging libraries or sets of algorithms can also be utilized. In another embodiment, two or more libraries are utilized, such as the ZBar library in combination with the ZXing image library, to find QR codes in the image. In embodiments, depending on the image, by utilizing algorithms from each library in combination, a higher percentage of QR codes can be found.

Returned to the PIPS computer program 117 are the location and size of the code within the image (which can be easily converted into physical world units such as inches since the image has been rectified using the four corner selection) as well as the data contained within the code. The data within the code is used to look up the item in the database, and if the item data is valid, it is saved into the output planogram .yaml file. Effectively, then, the PIPS computer program 117 pulls information from the corporate readable code database 118 or other connected databases. The readable code data obtained interfaces with the QR code 116 data within the PIPS computer program 117 to create an output of a completed PIPS computer program file 119. At this point, the planogram file 119 has been recorded to disk. For each QR code what is saved to disk is the location of the code on the planogram, in physical units (inches) relative to the four selected corners, as well as the identifiers for the item and fixture at that location. The completed planogram program file 119 is sent to retail stores via the PIPS computer program 117, referring again to FIG. 7A.

Figure 8A:
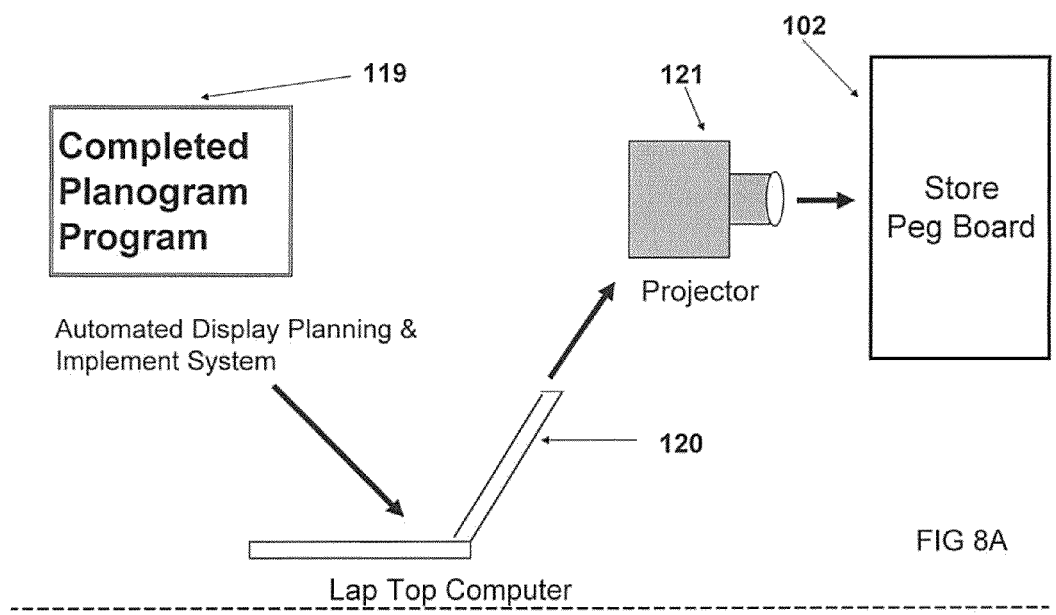
FIG. 8A depicts the flow of the completed planogram program accessed by a laptop computer on the retail sales floor, according to an embodiment.
Figure 8B:
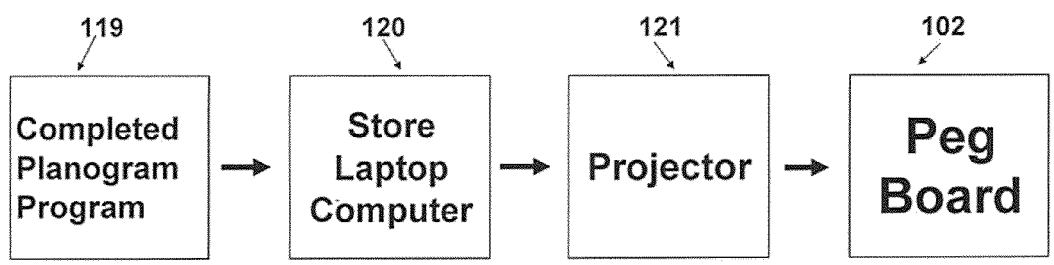
FIG. 8B is a flowchart of a PIPS computer planogram program sending the completed planogram to retail computers for projection onto pegboards in various store locations, according to an embodiment.
Figure 8C:
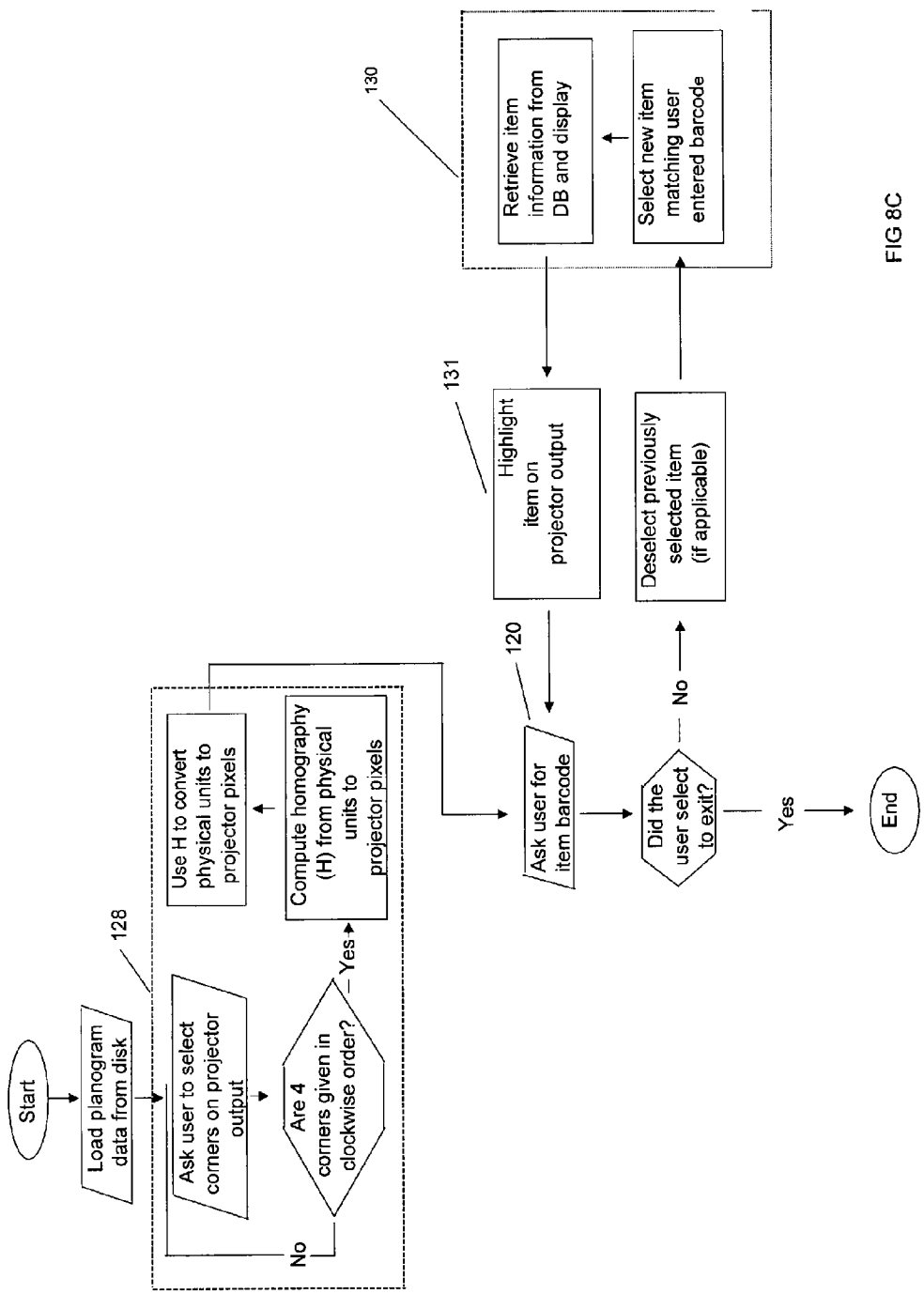
FIG. 8C is a flowchart of an algorithm of the PIPS computer program used at the retail location, according to an embodiment.

FIG. 8A depicts the flow of the completed planogram program file 119 accessed by a laptop computer 120 on the retail sales floor. The fixture and merchandise data and their location information is projected onto the stores pegboard 102 by use of a projector 121 which is connected to the laptop computer 120. FIG. 8B depicts the flow of the interaction of the components of embodiments used in retail stores. The flowchart of FIG. 8C illustrates an algorithm of the PIPS computer program 117 used at the retail location. Within the PIPS computer program the QR code locations are transformed from physical units to projector pixels at 128. In an embodiment, the four corners are selected by the user. The four corners can have the same physical relation to each other (width & height) as they did when the planogram was recorded at corporate. These four points allow the system to estimate a second homographic perspective transformation from physical units (inches) back to the pixels of the projector. By using both of these transformation (one at recording and once at display) is how we can convert from the pixels of the camera to the pixels of the projector.

The action of using a bar code reader or other accessing method equivalent in its ability to select a merchandise or fixture is shown at 129. Generally, the PIPS computer program 117 retrieves information on merchandise 107 or fixtures 106 by accesses the corporate database 130. The location for placing that selected item of merchandise 107 or fixture 106 is highlighted 131 when projected onto the pegboard 102. Specifically, when an item is scanned with the barcode scanner, the computer is given its identifier. In an embodiment, this is a UPC code, but could be any scannable code or other readable code. First, the planogram .yaml file is scanned to see if any QR codes reference the scanned readable code either as an item or a fixture. If they do, the item/fixture is read from the database in order to determine its size in inches. The size is then used to define a rectangular region on the pegboard where the item should be placed. This rectangular region is then transformed from inches to image pixels and projected onto the pegboard via the projector. This search and projection is repeated for all QR codes, and every time a code is scanned via the barcode scanner. Once the rectangular region in the pixel space of the image is defined, it can either be filled with a solid pixel color, or scale and blit an item image into that rectangular region which provides flexibility in the highlight routine. In embodiments, the blit operation acts to combine several images into one using a raster operator.

Figure 9:
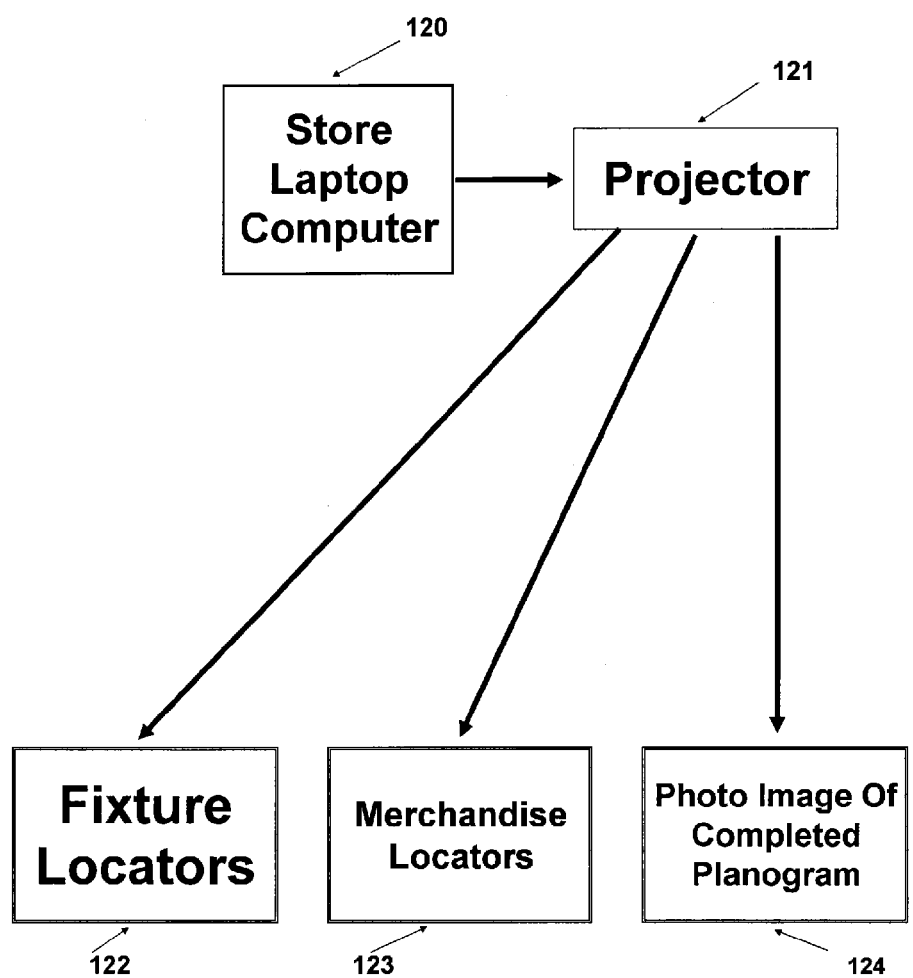
FIG. 9 is a summary of projections embodied within the invention including but not limited to the sending of an image identifying location for placement of fixture locations on pegboard, an image identifying location for placement of specific merchandise locations on peg board, and a photo image of finish planogram as set in the corporate planogram room, according to an embodiment.
Figure 10:
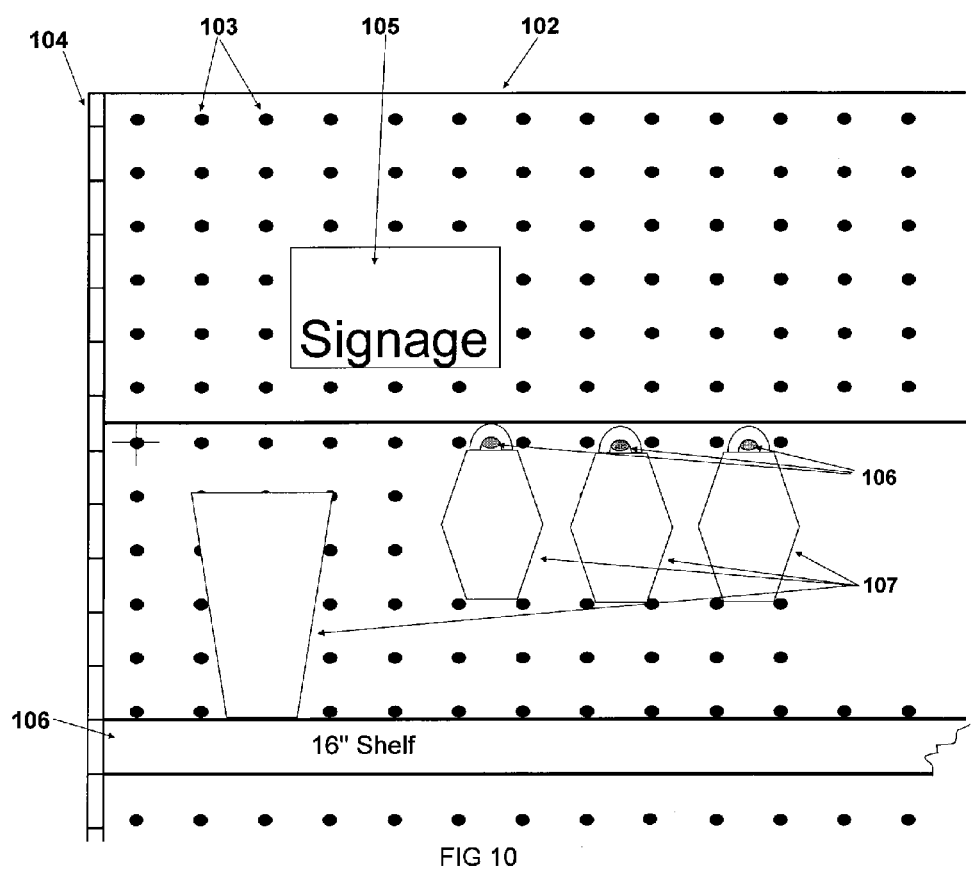
FIG. 10 is an illustration of a portion of a finished planogram once completed and set in stores with fixtures and merchandise displayed to match the original planogram created in the corporate planogram room of FIG. 1, according to an embodiment.

FIG. 9 depicts a flow chart of the embodiments of the invention showing the various projections that the PIPS computer program 117 provides at retail store locations. An in store computer 120 projects these functions onto the store pegboard 102 by means of a projector 121. The projections from the PIPS computer program 117 provide three distinct functions for setting a planogram in the retail store which replicates exactly the planogram as originally created in the corporate planogram room. These projections contain illuminated fixture locators 122, illuminated merchandise locators 123, and a photographic image of the completed planogram as set in the corporate planogram room 124. FIG. 10 shows the completed planogram set in the retail store which is identical to the planogram originally created in the corporate planogram room.

Figure 11A:
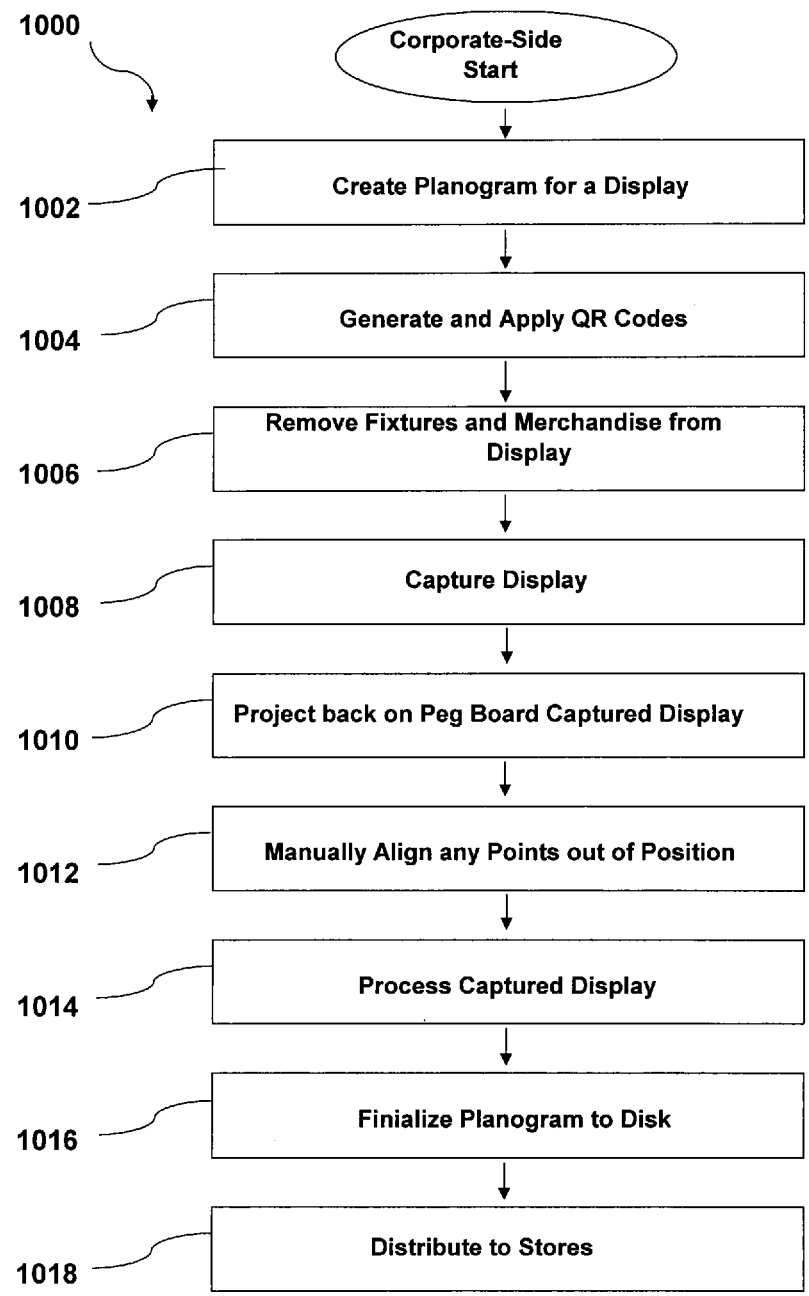
FIG. 11A is a flowchart of a method of generating a planogram on the corporate (or non-store location) side for a display, according to an embodiment.

In operation, referring to FIG. 11A, a method of generating 1000 a planogram on the corporate (or non-store location) side for a display, according to an embodiment, is depicted. At 1002, the planogram to be displayed at individual retail locations is created. As described above, this typically includes involvement by Senior Buyers, Corporate Planners, Divisional and Senior V.P.s. to create an optimal merchandise display to be replicated in each of the retail locations. Creation of the base planogram at 1002 can be done by any known method, including traditional hand-placement methods or online, digital methods with subsequent conversion to a physical display, in the case where the senior managers may wish to have a physical representation of the planogram. As part of the creation of the planogram, the board height and length will be known or can otherwise be measured. This information can be documented for use later. Optionally, and subsequent to the display being finalized, a digital picture of the entire display can be taken. At 1004, QR codes are generated. In an embodiment, generating QR codes comprises combining merchandise information with fixture information into a single, machine-readable QR code for a specific display fixture. Specifically, each fixture is designated with a specific item of merchandise. In embodiments, QR codes can include other information, including quantity.

Procedurally, at 1004, a fixture barcode is scanned. The fixture barcode identifies the specific fixture to have a particular item of merchandise. For example, the fixture barcode could be a 6" hook, or 12" shelf. After the fixture barcode is scanned, the merchandise barcode of the merchandise to be placed on that particular fixture is scanned. For example, merchandise for the 6" hook could be a white spatula, or in the case of the 12" shelf, the merchandise could be a box of envelopes. Once scanned, the respective fixture or merchandise data is recalled from databases coupled to the system. The fixture and merchandise data is combined by the system and a QR code containing fixture and the respective merchandise for that fixture is generated for each fixture.

Subsequent to QR code generation, adhesive QR code labels can be printed by a printer connected to the PIPS system. In an embodiment, the adhesive QR code labels are affixed to the display at a known location relative to the fixture represented by the respective QR code label. In an embodiment, QR code labels can be affixed immediately above the respective fixtures. In another embodiment, QR code labels can be affixed below, to the side, or at a corner of the respective fixtures.

At 1006, once the QR code labels are affixed to the display, all of the merchandise is removed from the display. Subsequently, all of the fixtures are removed from the display. The display is thus left with just the affixed QR codes, which were placed appropriately to represent fixture locations. In an embodiment, the display pegboard is thus emptied.

At 1008, the display is digitally captured. In an embodiment, the digital capture is with a digital camera. In other embodiments, a scanner, laser, or any other suitable image creator is utilized.

At 1010, the captured display is projected back onto the planogram peg board which still has all of the QR codes attached. Each fixture readable code beam of light and merchandise readable code beam of light is then projected back on to the peg board to confirm that all of the individual beams of light align with their corresponding QR code locations, which contain both the fixture and merchandise readable codes.

At 1012, if any points of light that do not align with their corresponding QR codes, the positions can be manually moved into proper alignment using the PIPS system manual adjustment function.

At 1014, the captured display is processed by the system. In an embodiment, the previously-recorded display height and length are entered into the system for processing of the captured image. Referring to FIG. 7B, a processing algorithm according to an embodiment is depicted. Thus, a processed planogram output file is generated. In an embodiment, the processed planogram output file can be a .yaml file. The processed data can be output into other suitable data formats. In an embodiment, the optional digital image of the fully assembled planogram can be incorporated into the planogram output file.

At 1016 the finalized planogram is moved to disk or other storage, thereby finishing the corporate planogram process. In another embodiment, the finished planogram can be moved to cloud storage for ease of subsequent access.

At 1018, the processed planogram output file can be distributed to individual retail stores. In an embodiment, the processed planogram output file is emailed to individual retail stores. In other embodiments, physical delivery of an electronic copy of the processed planogram output file via a storage device is also possible, for example with a flash drive, writable disc (CD, DVD, etc.), or portable hard drive.

Figure 11B:
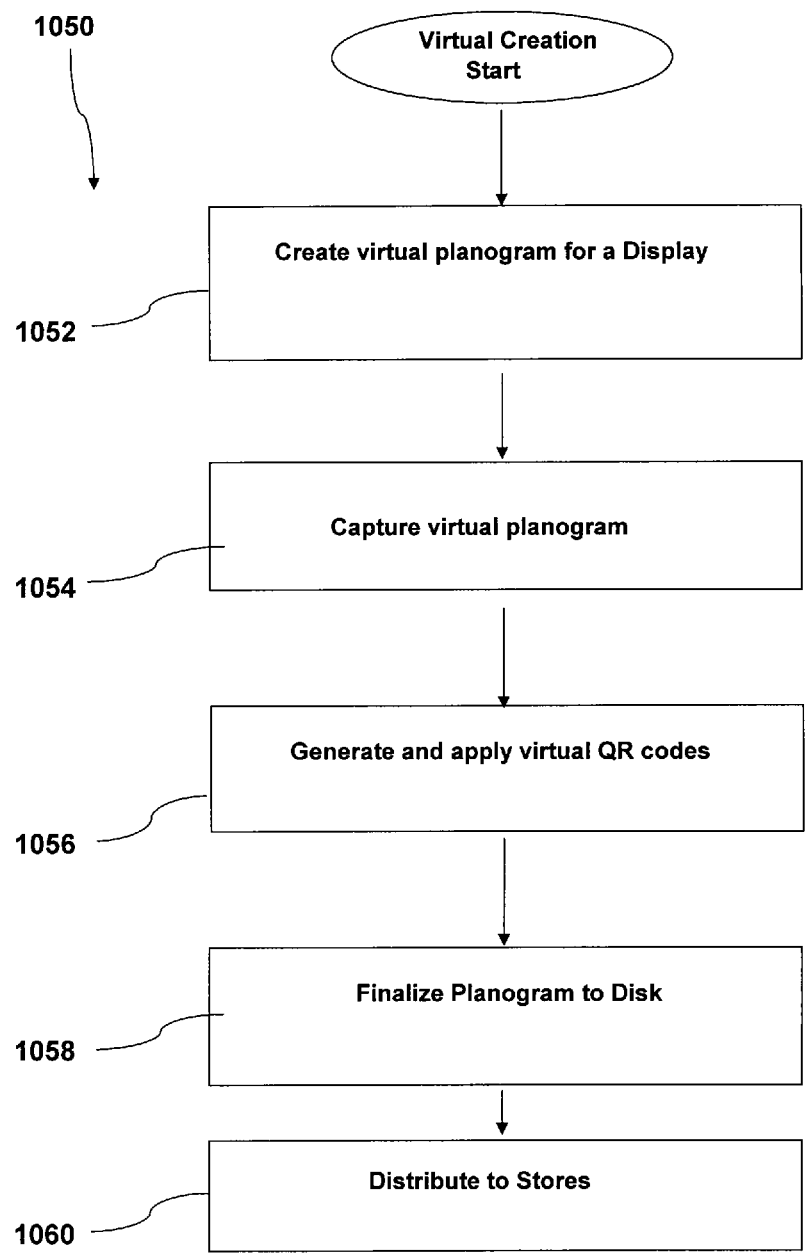
FIG. 11B is a flowchart of a method of virtually generating a planogram and subsequent processing on the corporate (or non-store location) side for a display, according to an embodiment.

In another embodiment, the planogram is created virtually within the PIPS system. PIPS computer program 117 is thereby further configured to create customized planograms such that layouts of any desired merchandising display can be virtually created within the software, according to aspects of method 1050. Referring to FIG. 11B, a method 1050 of processing a virtually-created planogram is depicted.

At step 1052, the virtual planogram for a display is created. Planning professionals can individually or collaboratively use system software to create customized planograms. Layouts of any desired merchandising display can thereby be virtually created. This may be via collaboration online or via a networked system or individually by a particular planner at a single or combination of system terminal(s). In an embodiment, each item of merchandise and the fixture on which that merchandise is displayed (peg hook, shelf, divider, hanger, etc.) can be virtually accessed or selected and subsequently virtually manipulated to be in a desired position. Revisions or iterations of the planogram display can be created in finalizing the planogram.

Once the planogram is defined, a virtual image can be recorded of that completed planogram at step 1054. This image can be subsequently used to set the display in retail stores just as the digital picture taken of the physical display can be projected onto the display pegboard in retail stores to give an indication of the position of the fixtures and merchandise.

At step 1056, computer program 117 can access the details of each item of merchandise and the fixtures on which the merchandise is displayed, as the data will be stored or accessible by the system because each piece was virtually installed on the virtual display. These data can be merged to create a unique QR code for the respective merchandise and supporting fixture. The unique QR code for the merchandise and supporting fixture can then be applied to the virtual display by virtually positioning the QR code within the planogram file or image, just as in the physical display embodiment.

At step 1058 the finalized planogram is moved to disk or other storage, thereby finishing the planogram creation (non-store side) process. In another embodiment, the finished planogram can be moved to cloud storage for ease of subsequent access.

At step 1060, the processed planogram output file can be distributed to individual retail stores. In an embodiment, the processed planogram output file is emailed to individual retail stores. In other embodiments, physical delivery of an electronic copy of the processed planogram output file via a storage device is also possible, for example with a flash drive, writable disc (CD, DVD, etc.), or portable hard drive.

In an embodiment, prior to capturing the virtual planogram 1054 or instead of creating a virtual planogram 1052 by computer program 117, the system accepts as an input a planogram image or other suitable planogram file created outside of the PIPS system (not shown). In such an embodiment, the inputted planogram image or planogram file can be created by any number of commercially available planogramming software products or other virtual applications or web-based interfaces. In embodiments, the inputted image or file can be manipulated within the system. In another embodiment, the inputted image or file can be subsequently converted into a file or type typically utilized within the system.

In an embodiment where a planogram image or file is inputted, capturing the virtual planogram contents at 1054 comprises using image recognition algorithms to identify fixtures and merchandise within the image or file. In another embodiment, the inputted image can contain identifying code data to identify each fixture and piece of merchandise within the planogram. Other suitable identifying procedures or algorithms are also contemplated. Each fixture and piece of merchandise is then identified.

Likewise, in the instant embodiment, a unique QR code for the merchandise and supporting fixture can then be generated at step 1056 by virtually positioning the QR code within the inputted or subsequently-generated file. Processing can then proceed as described above with the planogram moved to disk or other storage device(s), for example a flash drive, writable disc (CD, DVD, etc.), or portable hard drive, on to cloud storage, for distribution to retail stores.

Figure 12:
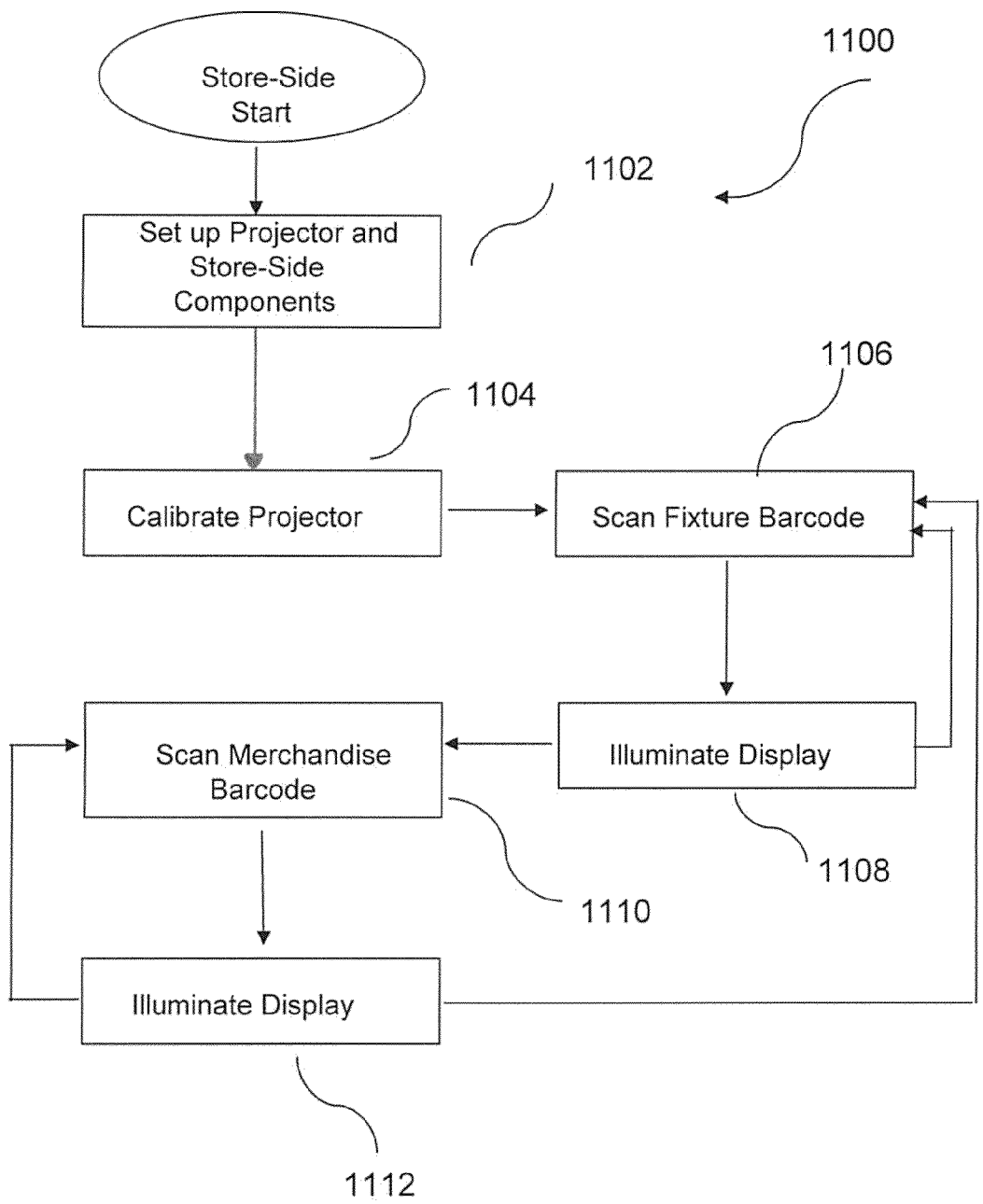
FIG. 12 is a flowchart of a method of installing the planogram in a retail location developed in the corporate or non-store location, according to an embodiment.

Referring to FIG. 12, a method of installing 1100 the planogram developed in the corporate or non-store location by method of generating 1000, according to an embodiment, is depicted. Typically, method of installing 1100 is done in the retail store after completion of method of generating 1000 in the corporate or virtual environment.

At 1102, the retail-side software is loaded into a laptop computer. A short throw projector and code reader are coupled to the computer. The projector is positioned in front of the display area where the planogram is to be recreated.

At 1104, the projector is calibrated. Because the projector can be any distance away from the display, as long as the projection covers the entire display, the projector can be calibrated to the particularly set distance. The retail-side software prompts the user to select the four corners in a clockwise direction. The homography from physical units to projector pixels can then be calculated. Once the homography is calculated, physical units to projector pixels can be converted. Other calibration methods are also considered. For example, the projector could be set up a known distance from the display, or other display area interactions could be conducted.

Optionally, and not shown in FIG. 12, the optional digital picture taken of the entire display with merchandise and fixtures on the display can be projected onto the empty display to give a rough indication of the position of the fixtures and merchandise.

At 1106, a fixture barcode is scanned by the user with the coupled barcode reader. The fixture-specific data is subsequently retrieved from a fixture database.

At 1108, the display is illuminated and the fixture location and shape are highlighted on the projector. In an embodiment, all of the fixtures are first installed onto the display prior to any merchandise items. Thus, as depicted in FIG. 12, additional fixture barcodes can be scanned at 1106 after the display is illuminated at 1108. However, the system allows for the scanning of fixtures or merchandise in any order. In an embodiment, the system provides an error when merchandise is scanned prior to its corresponding fixture, as no display fixture will be available to install that particular merchandise.

At 1110, a merchandise barcode is scanned by the user with the coupled barcode reader. The merchandise-specific data is subsequently retrieved from a merchandise database. In an embodiment, the merchandise and fixture databases are the same database.

At 1112, the display is illuminated and the merchandise location and shape are highlighted on the projector. Additional merchandise barcodes can be scanned at 1110 after the display is illuminated at 1112. Further, if a particular fixture was inadvertently missed, it can be scanned again at 1106. As described, the system allows for the scanning and display of fixtures or merchandise in any order.

FIG. 8C further depicts the flow of the steps of 1104 through 1112 with respect to the software processing.

As described above, the present invention provides various techniques for improving the efficiency and efficacy for recording a planogram and recreating that planogram in one location or at a plurality of locations. In particular, this is achieved through the application of image recording captured within the planogram design environment. In addition, through the collecting and merging of merchandise and fixture data, systems and QR codes are created for capture of design and more efficient recreation of that design at remote locations. The use of the Projected Image Planogram System (PIPS) assures accuracy in recreating the planogram to match the planogram as originally conceived, designed, and approved. For at least these reasons, the above described techniques represent advancement over prior art teachings, over current methods of planogramming.

Other embodiments of the invention are possible without departing from the spirit of the invention. While particular preferred embodiments have been shown or used as descriptors, changes and modifications may be made without departing from the instant teachings. For example, where specific examples describe shelves or peg hooks, it is understood that other types of product display devices, e.g. vertical display racks, specialize fixtures, product specific fixturing, and custom merchandise holders, could be equally employed. Pegboard and pegboard display equivalents such as slat boards, racking and custom made display sections would also apply. While the embodiments described include images and location identification markings projected, all performed by means of a projector, this description of these embodiments is not so limiting as to be construed as just one manner or one type of marking for identifying locations (of merchandise or fixturing) or one image projection of the planogram or aspects of the planogram, but includes all methods and manners of projecting or viewing projected images and illuminated markings that may be used for such purposes or for improved application or function of the embodiments of this invention. Thus, while the invention has been shown in only a few embodiments, it is not so limited but is of a scope defined by the following claim language which may be broadened by an extension of the right to exclude others from making or using the invention as is appropriate under the doctrine of equivalents. It is therefore contemplated that any and all modifications, variations, or equivalents of the above described teachings fall within the scope of the basic underlying principles disclosed above and claimed herein.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The claims provided herein are to ensure adequacy of the present application for establishing foreign priority and for no other purpose.

What is claimed is:

1. A system for planning a retail display, the system comprising:
    a merchandise fixture operably coupleable to the retail display at a location on the retail display, the fixture having a fixture code;
    a merchandise item operably coupleable to the merchandise fixture and having a merchandise code;
    a digital camera configured to capture image data of the retail display;
    a code reader configured to read the fixture code and the merchandise code;
    memory configured to store data; and
    a programmable circuit in electrical communication with the digital camera, the code reader, and the memory, the programmable circuit programmed to:
        receive code input from the code reader, the code input from the code reader including the fixture code and the merchandise code,
        generate a combined code based on the received code input, the combined code including data of the fixture code and data of the merchandise code,
        receive the image data of the retail display from the digital camera, the image data including image data depicting the combined code at the location on the retail display, and
        store a planogram output file in memory, the planogram output file including the combined code and the location of the combined code, thereby including the location and identity of the merchandise fixture and the merchandise item.

2. The system of claim 1, further comprising a projector in electrical communication with the programmable circuit and configured to illuminate on the retail display, wherein the programmable circuit is further programmed to illuminate the retail display with an image of the combined code via the projector, the image of the combined code being projected at a location proximate the location on the retail display of the combined code and corresponding merchandise fixture when operably coupled to the retail display.

3. The system of claim 2, wherein the programmable circuit is further programmed to adjust the projected location of the image of the combined code.

4. The system of claim 2, wherein the programmable circuit is further programmed to cause an image of a finalized retail display having an image of the merchandise fixture coupled to the retail display and an image of the merchandise item coupled to the merchandise fixture to be illuminated onto the retail display, and the planogram output file further comprises the image of the finalized retail display.

5. The system of claim 1, further comprising at least one database of fixture data and merchandise data corresponding to the merchandise fixture and the merchandise items, the at least one database accessible by the programmable circuit.

6. The system of claim 1, further comprising a QR code printer in electrical communication with the programmable circuit, wherein the programmable circuit programmed to generate the combined code includes printing a QR code label via the QR code printer.

7. The system of claim 6, wherein the image data depicting the combined code at the location on the retail display includes image data depicting the QR code label affixed to the location at the retail display.

8. The system of claim 7, wherein the programmable circuit is further programmed to read the identified QR code label and parse out the fixture code and the merchandise code.

9. The system of claim 1, comprising a plurality merchandise fixtures and a plurality of merchandise items, and wherein the planogram output file includes locations and identities of the plurality of merchandise fixtures and the plurality of merchandise items.

10. The system of claim 1, wherein the programmable circuit is further programmed to virtually create a planogram output file.

11. A method of generating a planogram for a retail display, the method comprising:
    creating a retail display, the retail display having a plurality of merchandise fixtures and a plurality of merchandise items operably coupleable to the plurality of merchandise fixtures, each of the merchandise fixtures having a fixture code and each of the merchandise items having a merchandise code, each of the merchandise fixtures coupled to the retail display at a location on the retail display;
    generating at least one combined code, the at least one combined code including fixture code data and merchandise code data;
    applying the at least one combined code at one or more locations proximate the locations of the plurality of merchandise fixtures;
    capturing the display, including the at least one combined code;
    retrieving data related to the plurality of merchandise fixtures and the plurality of merchandise items; and generating an output, the output including the locations and the retrieved data of the plurality of merchandise fixtures and the plurality of merchandise items.

12. The method of claim 11, further comprising manually aligning the at least one combined code when the captured display does not automatically align with the created retail display.

13. The method of claim 11, further comprising removing the plurality of merchandise fixtures and the plurality of merchandise items from the retail display after generating the at least one combined code.

14. The method of claim 11, further comprising displaying the captured display at a second, empty, retail display.

15. The method of claim 14, further comprising displaying a highlighted location and shape of a merchandise fixture or a merchandise item.

\* \* \* \* \*